(12) United States Patent
Kato

(10) Patent No.: US 9,001,377 B2
(45) Date of Patent: Apr. 7, 2015

(54) IMAGE FORMING APPARATUS AND METHOD OF CONTROLLING THE IMAGE FORMING APPARATUS

(71) Applicant: Oki Data Corporation, Tokyo (JP)

(72) Inventor: Hiroshi Kato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/260,921

(22) Filed: Apr. 24, 2014

(65) Prior Publication Data

US 2014/0320916 A1 Oct. 30, 2014

(30) Foreign Application Priority Data

Apr. 26, 2013 (JP) ................................. 2013-094237

(51) Int. Cl.
*G06K 15/02* (2006.01)
*G06F 15/00* (2006.01)
*G06K 1/00* (2006.01)
*G06F 3/12* (2006.01)
*G06K 15/14* (2006.01)

(52) U.S. Cl.
CPC ...... *G06K 15/14* (2013.01); *H04N 2201/04744* (2013.01); *H04N 2201/04731* (2013.01); *H04N 2201/04732* (2013.01); *H04N 2201/04712* (2013.01); *H04N 2201/04767* (2013.01); *H04N 2201/04734* (2013.01); *H04N 2201/04729* (2013.01); *H04N 2201/0471* (2013.01)

(58) Field of Classification Search
None
See application file for complete search history.

(56) References Cited

U.S. PATENT DOCUMENTS

| 7,798,634 | B2 * | 9/2010 | Miyahara et al. | 347/106 |
|---|---|---|---|---|
| 2005/0281573 | A1 * | 12/2005 | Kitagawa et al. | 399/49 |
| 2011/0001990 | A1 * | 1/2011 | Takatsuka | 358/1.2 |
| 2011/0002702 | A1 * | 1/2011 | Niijima | 399/44 |
| 2011/0002704 | A1 * | 1/2011 | Fujita | 399/74 |

FOREIGN PATENT DOCUMENTS

JP 2006-091736 A 4/2006

* cited by examiner

*Primary Examiner* — Satwant Singh
(74) *Attorney, Agent, or Firm* — Rabin & Berdo, P.C.

(57) ABSTRACT

An image forming apparatus performs density correction. An image forming section forms a density detection image on a belt. A light source irradiates the image with light. A light receiving section receives light reflected from the image and outputs a plurality of intensity signals of the received light. An intensity obtaining section drives the belt and the light source, thereby illuminating the image a first number of times at intervals of a first distance as the belt runs, and the light receiving section receives the light reflected from the image, the first number of times being determined by at least the first distance and a second distance in which the first distance lies. A selecting section selects a second number of levels of light intensity from the plurality of intensity signals. A density correcting section performs print density correction using the second number of levels of light intensity.

16 Claims, 19 Drawing Sheets

EXPECTED OUTPUTS OF DENSITY SENSOR

| DUTY RATIO | K | Y | M | C |
|---|---|---|---|---|
| 30% | $KD_{30}$ | $YD_{30}$ | $MD_{30}$ | $CD_{30}$ |
| 70% | $KD_{70}$ | $YD_{70}$ | $MD_{70}$ | $CD_{70}$ |
| 100% | $KD_{100}$ | $YD_{100}$ | $MD_{100}$ | $CD_{100}$ |

AMOUNTS OF ADJUSTMENT FOR DEVELOPING VOLTAGE

| DUTY RATIO | K | Y | M | C |
|---|---|---|---|---|
| 30% | $\Delta KDB(A)_{30}$ | $\Delta YDB(A)_{30}$ | $\Delta MDB(A)_{30}$ | $\Delta CDB(A)_{30}$ |
| 70% | $\Delta KDB(A)_{70}$ | $\Delta YDB(A)_{70}$ | $\Delta MDB(A)_{70}$ | $\Delta CDB(A)_{70}$ |
| 100% | $\Delta KDB(A)_{100}$ | $\Delta YDB(A)_{100}$ | $\Delta MDB(A)_{100}$ | $\Delta CDB(A)_{100}$ |

AMOUNTS OF ADJUSTMENT FOR LED DRIVE TIME

| DUTY RATIO | K | Y | M | C |
|---|---|---|---|---|
| 30% | $\Delta KDK_{30}$ | $\Delta YDK_{30}$ | $\Delta MDK_{30}$ | $\Delta CDK_{30}$ |
| 70% | $\Delta KDK_{70}$ | $\Delta YDK_{70}$ | $\Delta MDK_{70}$ | $\Delta CDK_{70}$ |
| 100% | $\Delta KDK_{100}$ | $\Delta YDK_{100}$ | $\Delta MDK_{100}$ | $\Delta CDK_{100}$ |

WEIGHTING COEFFICIENTS FOR DEVELOPING VOLTAGE

| DUTY RATIO | K | Y | M | C |
|---|---|---|---|---|
| 30% | $KODB_{30}$ | $YODB_{30}$ | $MODB_{30}$ | $CODB_{30}$ |
| 70% | $KODB_{70}$ | $YODB_{70}$ | $MODB_{70}$ | $CODB_{70}$ |
| 100% | $KODB_{100}$ | $YODB_{100}$ | $MODB_{100}$ | $CODB_{100}$ |

WEIGHTING COEFFICIENTS FOR LED DRIVE TIME

| DUTY RATIO | K | Y | M | C |
|---|---|---|---|---|
| 30% | $KODK_{30}$ | $YODK_{30}$ | $MODK_{30}$ | $CODK_{30}$ |
| 70% | $KODK_{70}$ | $YODK_{70}$ | $MODK_{70}$ | $CODK_{70}$ |
| 100% | $KODK_{100}$ | $YODK_{100}$ | $MODK_{100}$ | $CODK_{100}$ |

~72

DUTY RATIO OF PRINTED IMAGE VERSUS PRINT
DENSITY FOR DIFFERENT DEVELOPING VOLTAGE

DUTY RATIO OF PRINTED IMAGE VERSUS PRINT
DENSITY FOR DIFFERENT LED DRIVE TIMES

| OUTPUT VOLTAGE OF DENSITY SENSOR (S3) ||
| DUTY RATIO | C |
|---|---|
| 30% | $CD_{30}' = 0.40$ |
| 70% | $CD_{70}' = 1.50$ |
| 100% | $CD_{100}' = 1.80$ |

FIG. 20  EXPECTED OUTPUT OF DENSITY SENSOR

| DUTY RATIO | C |
|---|---|
| 30% | $CD_{30}=0.50$ |
| 70% | $CD_{70}=1.60$ |
| 100% | $CD_{100}=2.00$ |

FIG. 21  AMOUNT OF ADJUSTMENT FOR DEVELOPING VOLTAGE

| DUTY RATIO | C |
|---|---|
| 30% | $\Delta CDB(A)_{30}=-50$ |
| 70% | $\Delta CDB(A)_{70}=-40$ |
| 100% | $\Delta CDB(A)_{100}=-20$ |

FIG. 22  OUTPUT VOLTAGE OF DENSITY SENSOR (S5)

| DUTY RATIO | C |
|---|---|
| 30% | $CD_{30}''=0.48$ |
| 70% | $CD_{70}''=1.61$ |
| 100% | $CD_{100}''=2.01$ |

FIG. 23  AMOUNT OF ADJUSTMENT FOR LED DRIVE TIME

| DUTY RATIO | C |
|---|---|
| 30% | $\Delta CDK(A)_{30}=40$ |
| 70% | $\Delta CDK(A)_{70}=20$ |
| 100% | $\Delta CDK(A)_{100}=40$ |

FIG. 24  WEIGHTING COEFFICIENT FOR DEVELOPING VOLTAGE

| DUTY RATIO | C |
|---|---|
| 30% | $CODB_{30}=1$ |
| 70% | $CODB_{70}=2$ |
| 100% | $CODB_{100}=3$ |

FIG. 25  WEIGHTING COEFFICIENT FOR LED DRIVE TIME

| DUTY RATIO | C |
|---|---|
| 30% | $CODK_{30}=2$ |
| 70% | $CODK_{70}=3$ |
| 100% | $CODK_{100}=1$ |

FIG. 26

| DUTY RATIO | GRADATION LEVEL | DENSITY |
|---|---|---|
| 0% | 0 | 0.00 |
| ⋮ | ⋮ | ⋮ |
| 20% | 51 | 0.33 |
| ⋮ | ⋮ | ⋮ |
| 40% | 102 | 0.65 |
| ⋮ | ⋮ | ⋮ |
| 60% | 153 | 0.98 |
| ⋮ | ⋮ | ⋮ |
| 80% | 204 | 1.30 |
| ⋮ | ⋮ | ⋮ |
| 100% | 255 | 1.50 |

FIG. 27

| GRADATION LEVEL | DENSITY |
|---|---|
| 0 | 0.00 |
| : | : |
| 51 | 0.30 |
| : | : |
| 60 | 0.33 |
| : | : |
| 102 | 0.60 |
| : | : |
| 115 | 0.65 |
| : | : |
| 153 | 0.90 |
| : | : |
| 165 | 0.98 |
| : | : |
| 204 | 1.20 |
| : | : |
| 230 | 1.30 |
| : | : |
| 255 | 1.50 |

| INPUT GRADATION LEVEL | OUTPUT GRADATION LEVEL |
|---|---|
| 0 | 0 |
| ⋮ | ⋮ |
| 51 | 60 |
| ⋮ | ⋮ |
| 102 | 115 |
| ⋮ | ⋮ |
| 153 | 165 |
| ⋮ | ⋮ |
| 204 | 230 |
| ⋮ | ⋮ |
| 255 | 255 |

| DUTY RATIO | K | Y | M | C |
|---|---|---|---|---|
| 20% | $KOD_{20}$ | $YOD_{20}$ | $MOD_{20}$ | $COD_{20}$ |
| 40% | $KOD_{40}$ | $YOD_{40}$ | $MOD_{40}$ | $COD_{40}$ |
| 60% | $KOD_{60}$ | $YOD_{60}$ | $MOD_{60}$ | $COD_{60}$ |
| 80% | $KOD_{80}$ | $YOD_{80}$ | $MOD_{80}$ | $COD_{80}$ |
| 100% | $KOD_{100}$ | $YOD_{100}$ | $MOD_{100}$ | $COD_{100}$ |

~85

IMAGE FORMING APPARATUS AND METHOD OF CONTROLLING THE IMAGE FORMING APPARATUS

BACKGROUND OF THE INVENTION

1. Field of the Invention

The present invention relates to an image forming apparatus and a method of controlling the image forming apparatus, and more particularly to an electrophotographic printer with a density detecting mechanism for correcting the print density of an image.

2. Description of the Related Art

Conventional color image forming apparatus, including a color electrophotographic printer, include a plurality of so-called process units, each process unit including a photoconductor, charging means, exposing means, and developing means. A tandem color image forming apparatus includes four process units: black (K), yellow (Y), magenta (M), and cyan (C) process units aligned along a paper transport path. When paper advances through these process units, toner images of corresponding colors are transferred one over the other onto the paper in registration.

In the aforementioned image forming apparatus, the print density of images can vary due to changes in the charging characteristic of toner and changes in the sensitivity characteristic of the photoconductive drum over time, and changes in environmental temperature and humidity. For this reason, the print density is detected at predetermined timings, for example, when the image forming apparatus is turned on and after a predetermined number of pages has been printed.

Japanese Patent Publication No. 2006-91736 discloses one such printer with a print density detecting mechanism. A test image is printed on a transport belt that transports the print medium thereon. A density detecting means reads the test image. The physical characteristics of the image forming apparatus including developing voltage and exposure time of the print engines are adjusted in accordance with the thus read test image, thereby correcting the print density of printed images.

The transport belts used in conventional printers are endless belts formed by joining two ends of a belt into a loop. The reflection characteristic of the joined portion may differ from that of the other portions of the belt, causing uneven reflection compared to other areas of the belt. Therefore, conventional printers suffer from a problem in that the light reflected from the jointed portion of the belt causes poor density correction results.

SUMMARY OF THE INVENTION

An object of the invention is to provide an image forming apparatus and a method in which density correction can be performed without sacrificing accuracy even when a transport belt has a surface area having a reflection characteristic different from other surface areas on the transport belt.

An image forming apparatus performs density correction.

A density detection image forming section is configured to drive at least one image forming unit to form a density detection image on a surface of a belt. A drive section configured to drive the belt to run. A light source that irradiates the density detection image with light. A light receiving section that receives light reflected by the density detection image and outputs an output signal indicative of an intensity of the received light. A light intensity obtaining section configured to cause the drive section to drive the belt to run and the light source to emit light so that the light source irradiates the density detection image a first number of times at intervals of a first distance in a direction in which the belt runs, and the light receiving section receives the light reflected from the density detection image, the first number of times being determined by at least the first distance and a second distance in which the first distance lies. A selecting section configured to select a second number of levels of light intensity from a plurality of levels of light intensity obtained by the light intensity obtaining section. A density correcting section configured to perform print density correction for the at least one image forming unit by using the second number of levels of light intensity selected by the selecting section.

Further scope of applicability of the present invention will become apparent from the detailed description given hereinafter. However, it should be understood that the detailed description and specific example, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 11 illustrates a developing voltage adjustment table;

FIG. 12 illustrates an LED drive time adjustment table;

FIG. 13 illustrates a voltage weighting coefficient table;

FIG. 14 illustrates a time weighting coefficient table;

FIG. 20 shows the specific values for cyan listed in the sensor output expected value table;

FIG. 21 shows the control amounts of developing voltage for cyan;

FIG. 22 shows the output voltages of the sensor when the sensor reads the cyan segments having duty ratios of 30%, 70%, and 100%, respectively, from the density detection pattern;

FIG. 23 is a table illustrating the specific amounts of change in LED drive time for cyan;

FIG. 24 illustrates a voltage weighting coefficient table for cyan;

FIG. 25 illustrates a time weighting coefficient table for cyan;

FIG. 26 illustrates the relationship among the duty ratio, gradation level, and density;

FIG. 27 illustrates a target gradation table;

FIG. 29 illustrates a gradation correction table; and

FIG. 30 illustrates a target density data table.

DESCRIPTION OF THE INVENTION

Embodiment

With reference to the drawings, a description will be given of an image forming apparatus and a method of controlling the image forming apparatus. The image forming apparatus will be described with respect to a printer.

{Configuration}

Figure 1:
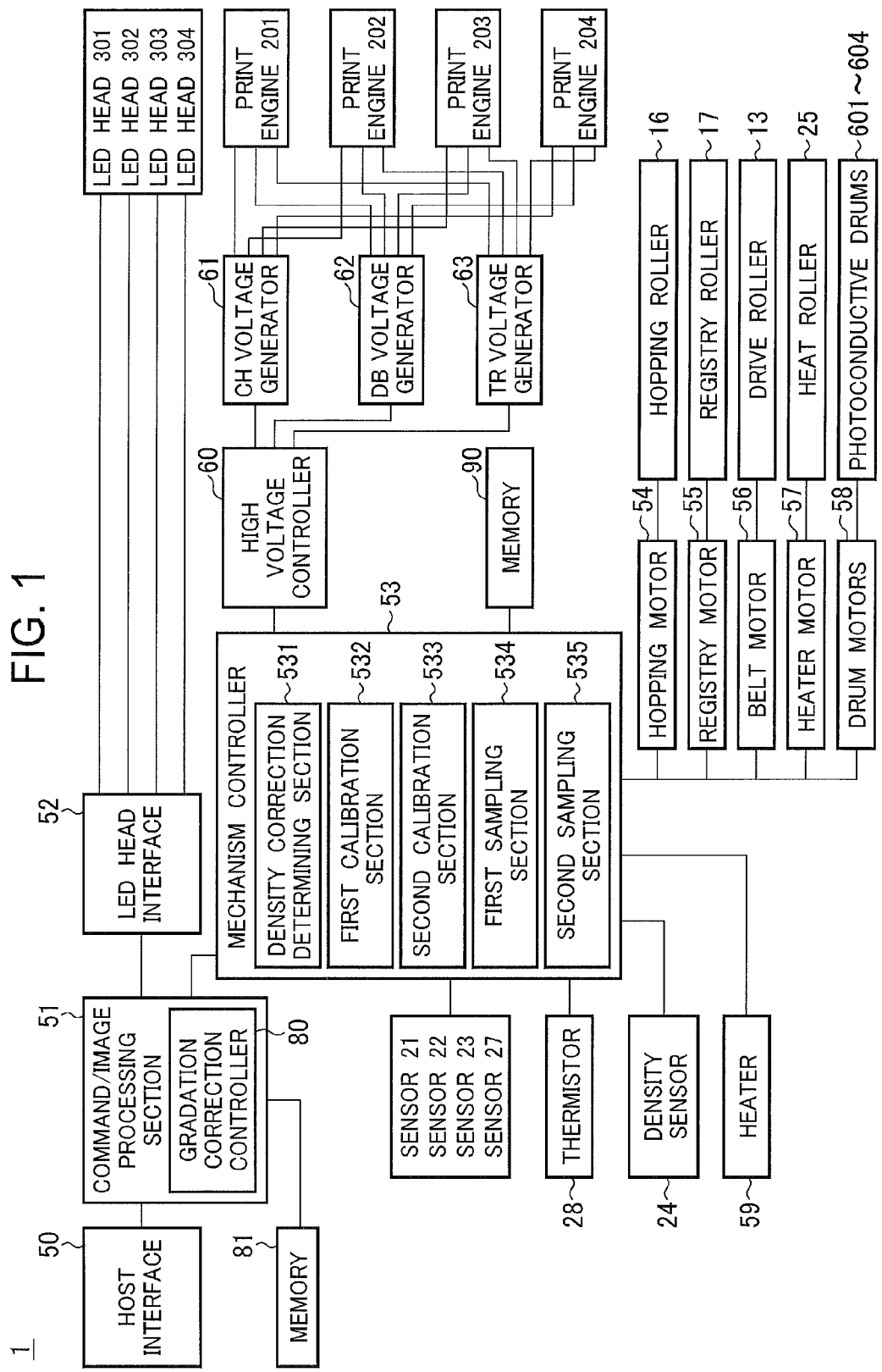
FIG. 1 is a block diagram, illustrating the control system of an image forming apparatus.
Figure 2:
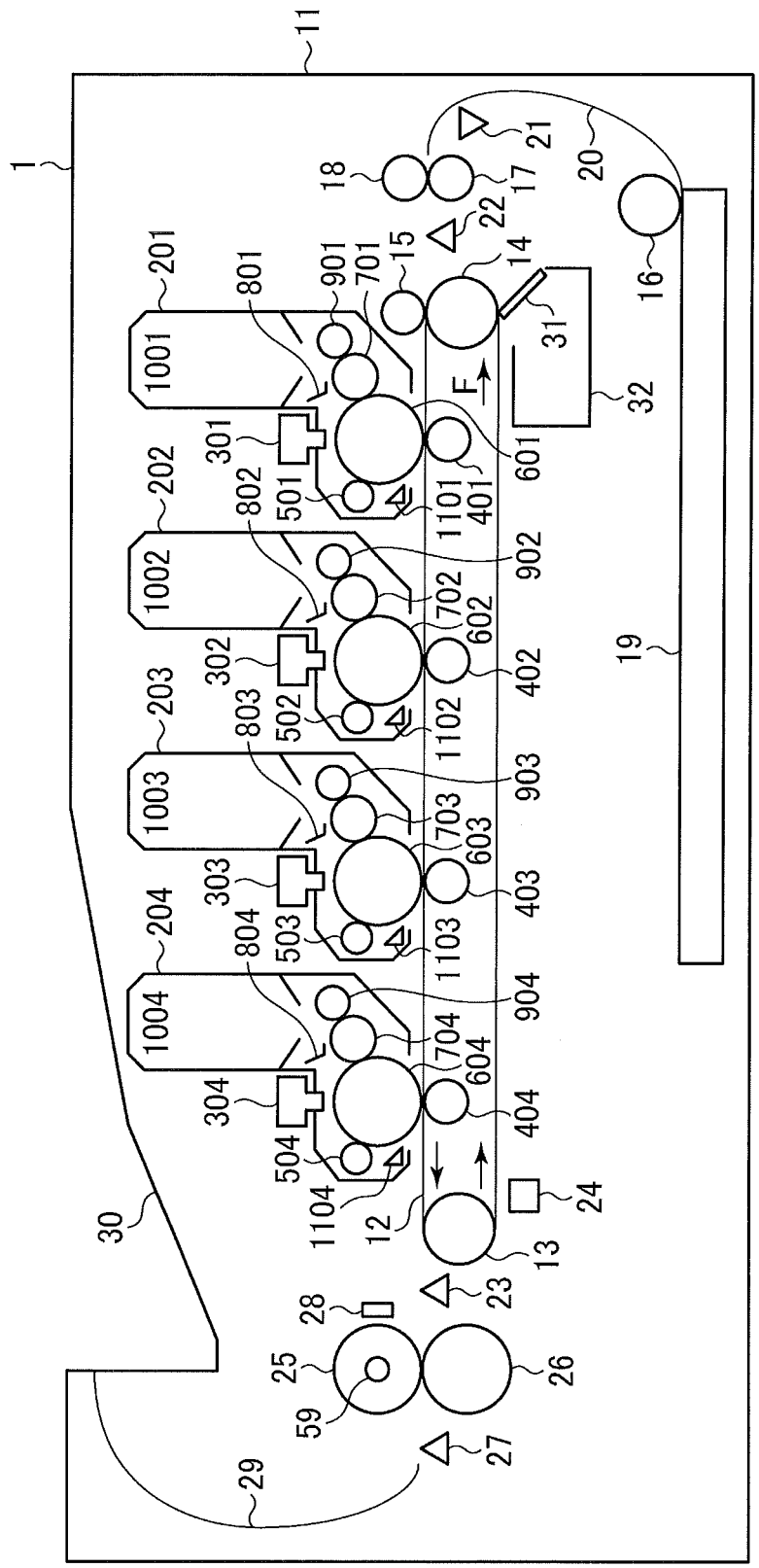
FIG. 2 is a schematic cross-sectional view of the image forming apparatus.

An image forming apparatus 1 takes the form of an electrophotographic printer with LED exposing devices. FIG. 1 is a block diagram illustrating the control system of the image forming apparatus 1. FIG. 2 is a schematic cross-sectional view of the image forming apparatus 1.

Referring to FIG. 2, the image forming apparatus 1 includes four independent process units or print engines 201, 202, 203, and 204 for forming black (K), yellow (Y), magenta (M) and cyan (C) images, respectively. A transport belt 12 extends from the black print engine to a fixing unit and serves as a part of a transport path in which a print medium such as paper is transported. The print engines 201, 202, 203, and 204 are aligned in this order along the transport belt 12.

The print engines 21-204 have charging rollers 501-504, photoconductive drums 601-604 that are uniformly charged by the corresponding charging rollers 501-504 and on which corresponding electrostatic latent images are formed, developing rollers 701-704 that supply toner to the electrostatic latent images formed on the photoconductive drums 601-604, developing blades 801-804, sponge rollers 901-904, neutralizing light sources 1101-1104 that neutralize the surfaces of the photoconductive drums 601-604, and toner cartridges 1001-1004 that supply toner of corresponding colors.

The operation of the developing sections will be described, by way of example, in terms of the black print engine 201. Each of the developing sections may be substantially identical; for simplicity only the operation of the developing section for forming black images will be described, it being understood that the other developing sections may work in a similar fashion. The toner cartridge 1001 supplies black toner into the developing section. The sponge roller 901 in turn supplies the black toner to the developing roller 701, and the developing blade forms a thin layer of the black toner on the circumferential surface of the developing roller 701, so that when the developing roller 701 rotates, the developing roller 701 supplies only a sufficient amount of toner to the photoconductive drum 601. When a thin layer of toner is formed on the developing roller 701, the sponge roller 901 rotates in pressure contact with the developing roller 701, thereby triboelectrically charging the toner.

LED heads 301-304 are disposed directly above the photoconductive drums 601-604, respectively. Each LED head includes an LED array, driver IC that drives the LED array, a group of registers that holds image data, a circuit board that holds the LED array, driver IC, and registers thereon, and a SELFOC® lens array (not shown) that focusses the light emitted by the LED array. Each LED array is energized in accordance with image data for a corresponding color received through an interface, and illuminates the charged surface of the photoconductive drum, thereby forming an electrostatic latent image on the photoconductive drum. The toner on the developing roller is supplied to the electrostatic latent image by the Coulomb force. Each of the toner cartridge 1001-1004 holds toner of a corresponding color. The transport belt 12 runs through the contact areas defined between the photoconductive drums 601-604 and transfer rollers 401-404.

The transport belt 12 is an endless belt formed of a semiconductive plastic film having high electrical resistance. When a drive roller 13 that drives the transport belt 2 is driven by a belt motor 56, the transport belt 12 runs in a direction shown by arrow "E". The transport belt 12 is sandwiched between the photoconductive drums 601-604 and transfer rollers 401-404. The transport belt 12 has a mirror-like outer surface.

A paper feeding mechanism for feeding paper into the transport path is located at the right lower corner of the color image forming apparatus 1 shown in FIG. 2. The paper feeding mechanism includes a hopping roller 16, a registry roller 12, and a paper cassette 19. A pick-up roller (not shown) selects the paper S or print medium on a sheet-by-sheet basis from the paper cassette 19, and the hopping roller 16 in turn feeds the paper into the transport path. The paper S is guided to the registry roller 17. If the paper S is skewed, the registry roller 17 and a pinch roller 18 cooperate to correct the skew. The paper S is then directed by the registry roller 17 into an area between an attraction roller 15 and the transport belt 12. The attraction roller 15 presses the paper S against the transport belt 12, so that the paper S is attracted to the transport belt 12 electrostatically. A tension roller 14 pulls the transport belt 12 in a direction shown by arrow "F" so that the transport belt 12 is in tension at all times.

A sensor 21 is upstream of the registry roller 17 with respect to the direction of travel of the paper S and a sensor 22 is downstream of the registry roller 17. These sensors detect when the paper S passes by these sensors 21 and 22. A sensor 23 is located downstream of the transport belt 14 with respect to the direction of travel of the paper S, and detects the trailing end of the paper S or detects whether the paper S has failed to leave the transport belt 12 normally.

A fixing mechanism is formed of a heat roller 25 and a pressure roller 26 in pressure contact with the heat roller 25, and is located downstream of the sensor 23. The fixing mechanism heats the toner image on the paper S to fuse into a permanent image. After leaving the transport belt 12, the paper S enters the fixing mechanism. The heat roller 25 is driven by a heater motor 57 in rotation and the pressure roller 26 is driven in rotation due to pressure contact with the heat roller 25. The heater roller 25 includes a heater 59 in the form of a halogen lamp, which serves as a heat source. A thermistor 28 is disposed in the vicinity of the surface of the heat roller 25 and monitors the temperature of the heat roller 25.

A discharge sensor 27 is located downstream of the heat roller 25 and detects the paper S jammed in the fixing mechanism or wrapping of the paper S around the heat roller 25. A guide 29 is located downstream of the sensor 27 and guides the paper S to a stacker 30 formed on the upper surface of the color image forming apparatus 1.

A cleaning mechanism includes a cleaning blade 31 and a waste toner tank 32, and is located beneath the transport belt 12. The cleaning blade 31 is directly under the driven roller 14 and is in pressure contact with the outer surface 1201 of the transport belt 12. The cleaning blade 31 is formed of a resilient rubber material or a plastic material, and scrapes the residual toner off the surface of the transport belt 12 into the waste toner tank 32.

Figure 3:
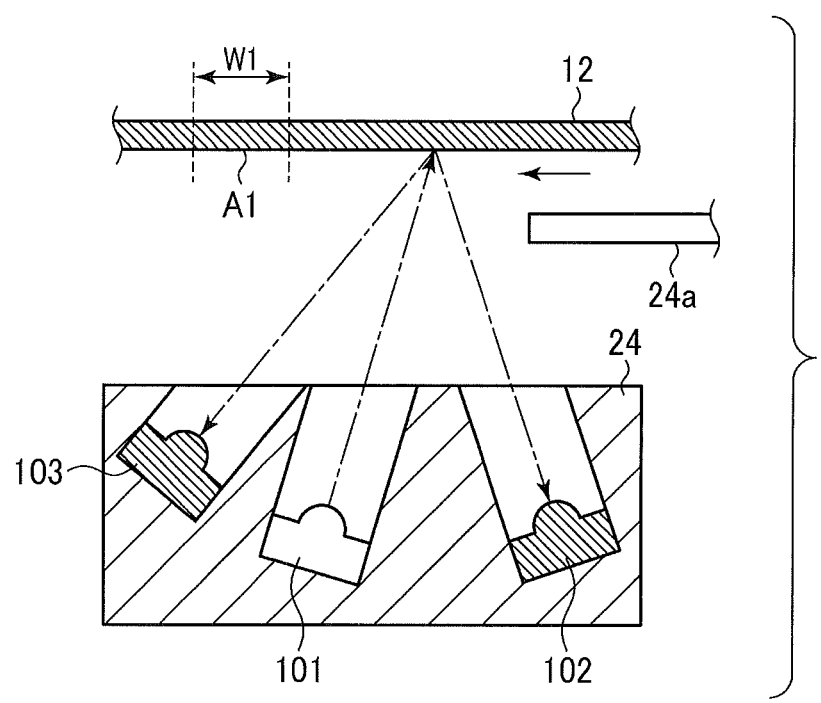
FIG. 3 illustrates the configuration of a density sensor.

A density sensor 24 is disposed directly under the transport belt 12 at a location near the drive roller 13. The density sensor 24 is a reflection type sensor incorporating a light transmitting section and two light emitting sections. The density sensor 24 measures the intensity of the light reflected from a density detection pattern printed on the transport belt 12, thereby detecting the print density of the image forming apparatus 1. FIG. 3 illustrates the configuration of the density sensor 24. The density sensor 24 includes an infrared light emitting diode (LED) 101 as a light source, a photo transistor 102 that receives the reflected light due to specular reflection, a photo transistor 103 that receives the reflected light due to diffuse reflection, and detects both the density of chromatic color (C, M, and Y) and the density of achromatic color (K). The photo transistors 102 and 103 constitute a light receiving means.

For detecting the density of chromatic colors, the photo transistor 103 receives the light reflected, due to diffuse reflection, from areas of color segments of the density detection pattern printed on the transport belt 12 in which the colored toner particles are present. The photo transistor 103 then outputs a voltage indicative of the amount of received light.

For detecting the density of an achromatic color, the photo transistor 102 receives the light reflected, due to specular reflection, from areas of the black segment of the density detection pattern from which the black toner particles are absent. The photo transistor 102 then outputs a voltage indicative of the amount of received light.

When the density sensor 24 detects the density of a black image, if the transport belt 12 does not reflect uniformly, the density detection is not accurate. For example, the transport belt 12 is an endless belt formed by joining two ends of a belt into a loop, the reflection characteristic of the joined portion differs from that of the other portions of the belt. The accuracy in detecting the density of a printed image may be improved by employing the transport belt 12 with uniform reflection characteristic over the entire surface thereof. However, this increases the manufacturing cost. In the first embodiment, control is performed so that the density is detected from areas having uniform reflection characteristic. It is assumed that the transport belt 12 according to the first embodiment has a non-uniform reflection characteristic in an area A1 over a width W1 (FIG. 3) in the direction in which the transport belt 12 runs. The width W1 is selected to be 5 mm in the embodiment.

With reference to FIG. 1, a description will be given of the configuration of a control system of the image forming apparatus 1. A host interface 50 is employed as a physical structure through which data is communicated with a host computer, and includes a connector and a communication chip. A command/image processing section 51 includes a microprocessor (not shown), a RAM, and hardware, and performs overall control of the image forming apparatus 1. The command/image processing section 51 receives commands and image data from the host computer, parses the commands, and renders the image data into bit map data using the microcomputer, RAM, and hardware. An LED head interface 52 includes a semicustom LSI, a RAM, and so on (not shown), and processes the bit map data received from the command/image processing section 51, thereby supplying bit map data for corresponding colors to the LED head 301, 302, 303, and 304, respectively.

A gradation correction controller 80 in the command/image processing section 51 corrects the gradation based on the detected density of a printed image and a gradation data previously stored in a memory 81. The gradation correction is briefly described as follows: When image data having a gradation level of 153 of a total of 256 levels is actually printed with a density corresponding to a gradation level of 165, correction is made to replace a signal having a gradation level of 165 with a signal having a gradation level of 153. In other words, the difference between the gradation data and the actual gradation level of the printed density. The memory 81 stores a target gradation table 87 (FIG. 27) that lists target gradation levels and a gradation correction table 84 (FIG. 29) that lists gradation correction results.

A mechanism controller 53 performs control of a variety of portions of the print engines of the image forming apparatus 1. In accordance with the outputs of the sensors and the commands from the command/image processing section 51, the mechanism controller 53 drives the motors 54-58, and controls the heater 59, a high voltage controller 60, the mechanisms of the print engines, and a high voltage power supply. The motors 54-58 are constituted of a variety of motors that drive the respective print engines and heat rollers, and drivers that drive these motors. The heater 59 takes the form of a halogen lamp disposed in the heat roller 25. A thermistor 28 is in the vicinity of the surface of the heat roller 25, and monitors the temperature of the heat roller 25 for temperature control of the heat roller 25.

Figures 9, 10:
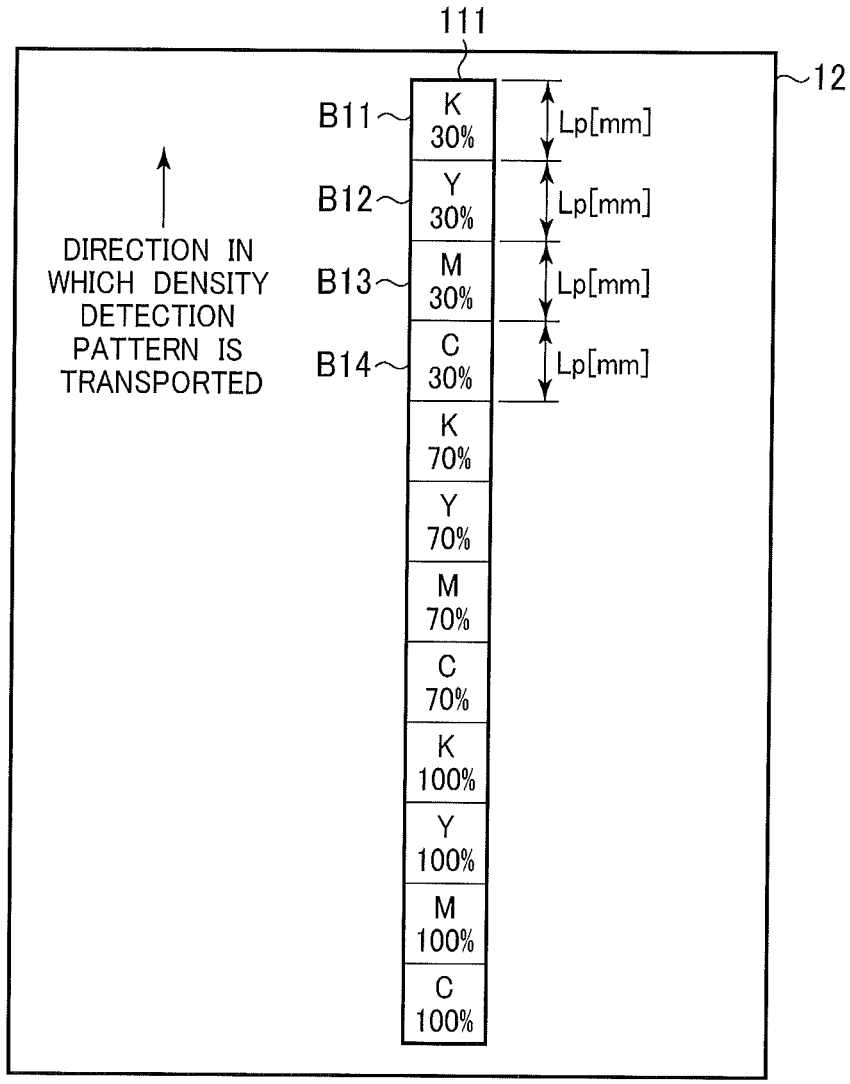
FIG. 9 illustrates a density detection pattern.
FIG. 10 illustrates a sensor output expected value table.
Figure 15:
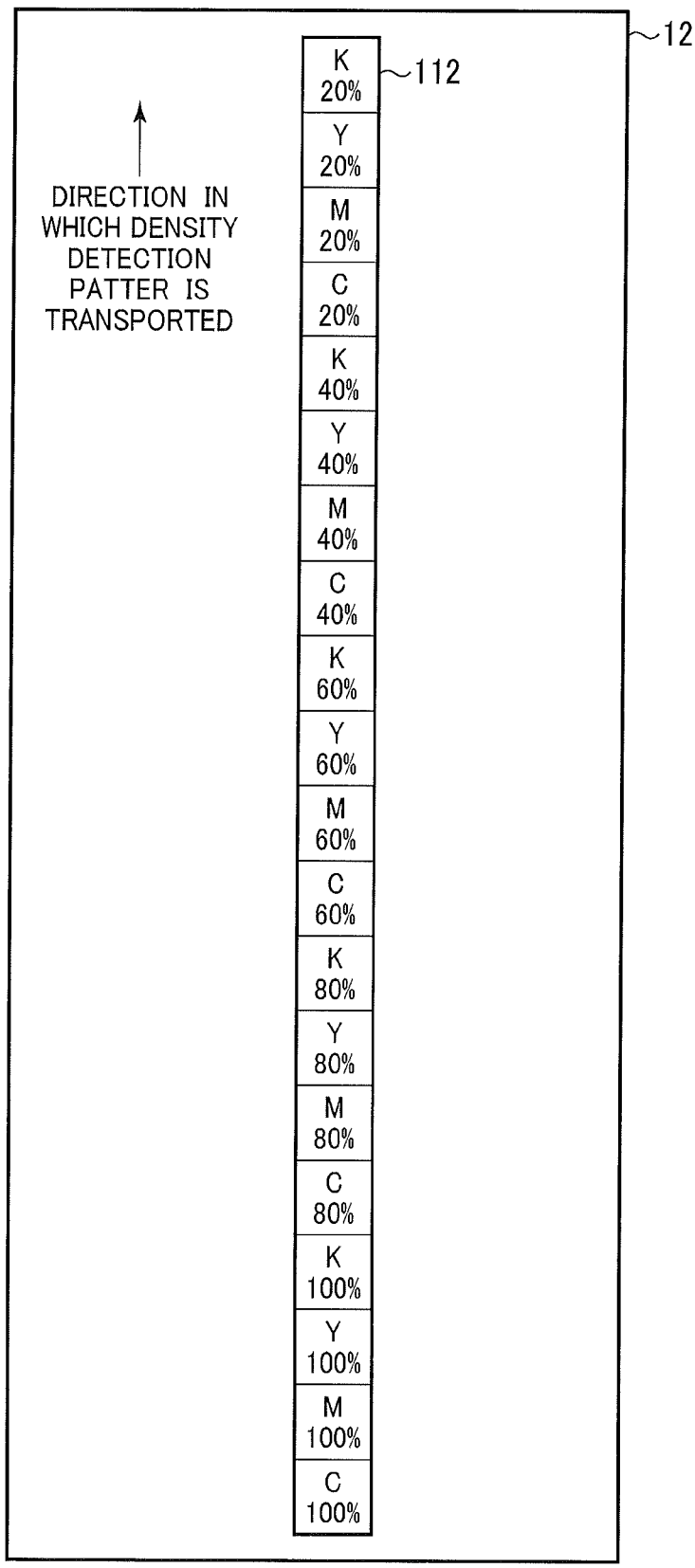
FIG. 15 illustrates another density detection pattern.

FIG. 9 illustrates a density detection pattern 111. FIG. 10 illustrates a sensor output expected value table 70. FIG. 11 illustrates a developing voltage adjustment table 82. FIG. 12 illustrates the LED drive time adjustment table 83. FIG. 13 illustrates a voltage weighting coefficient table 71. FIG. 14 illustrates a time weighting coefficient table 72. FIG. 15 illustrates a density detection pattern 112.

The mechanism controller 53 communicates with a memory 90 which stores the density detection pattern 111 shown in FIG. 9, a density detection pattern 112 shown in FIG. 15, a sensor output expected value table 70 shown in FIG. 10, a developing voltage adjustment table 82 shown in FIG. 11, an LED drive time adjustment table 83 shown in FIG. 12, a voltage weighting coefficient table 71 shown in FIG. 13, time weighting coefficient table 72 shown in FIG. 14, and a target density data table 85 shown in FIG. 30. The memory 90 stores the print density data describing the densities detected by the density sensor 24. The mechanism controller 53 includes a density correction determining section 531, a first calibration section 532, a second calibration section 533, a first sampling section 534, and a second sampling section 535.

The mechanism controller 53 reads the density data from the memory 90, and calculates how much change in exposure time should be made for the LED heads 301-304 so that the density of printed images is equal to the target density. An LED head interface 52 determines the drive time for driving the LED heads 301-304 from the changes in exposure time that should be made. In the first embodiment, the drive times for driving the LED heads 301-304 are changed, thereby changing the density of printed images. Alternatively, the current or drive voltage supplied to the respective light emitting diodes of the LED heads 301-304 may be changed.

The high voltage controller 60 takes the form of a microprocessor or a custom LSI (not shown), and generates, for example, charging voltages, developing voltages, and transfer voltages for the print engines 201-204. A CH voltage generator 61 generates the charging voltages for the respective print engines 201-204. A DB voltage generator 62 supplies the developing voltages to the respective print engines 201-204. A TR voltage generator 63 supplies the transfer voltages to the transfer rollers of the print engines 201-204. The TR voltage generator 63 includes a current detector or a voltage detector, thereby performing a constant current control or a constant voltage control.

The mechanism controller 53 reads the density data from the memory 90, and calculates how much the exposure time should be incremented or decremented for the LED heads 301-304 so that the density of printed images are equal to the target density. The high voltage controller 60 issues a command to change the developing voltage to the DB voltage generator 62. In the first embodiment, the developing voltages are changed to change the density of printed images. Alternatively, one of the supplying voltage and the charging voltage supplied to the respective print engines or both the supplying voltage and the charging voltage may also be controlled.

The density correction determining section 531 determines the timing at which the density correction process should be initiated. The density correction determining section 531 determines that the density correction process should be initiated once the required conditions for executing density correction process are met. These conditions may include turn-on of the image forming apparatus 1, printing of predetermined number of pages, and changes of environmental conditions.

The first calibration section 532 cooperates with the second calibration section 533 to perform calibration in which the current flowing through the infrared light emitting diode 101 is adjusted to change the amount of light emitted from the light emitting diode 101, thereby accommodating the variations in the mounting angle, distance, and temperature of the density sensor 24.

The first calibration section 532 performs the calibration of the photo transistor 102 for a black image. Specifically, the photo transistor 102 receives the light reflected back from the surface of the transport belt 12 as a reference reflector, and the first calibration section 532 adjusts the current flowing through the infrared light emitting diode 101 so that the output voltage of the photo transistor 102 is within a predetermined range.

The second calibration section 533 performs the calibration of the photo transistor 103 for cyan, magenta, and yellow images. The second calibration section 533 uses a shutter 24a as a reference reflector in place of a toner image printed on the transfer belt 12. The surface of the shutter 24a is coated with a material that exhibits diffuse reflection similar to the cyan, magenta, and yellow toner images printed on the transfer belt 12. Alternatively, the surface of the shutter 24a may be coated with toner. The shutter 24a is configured to move into and out of a space between the density sensor 24 and the transport belt 12 under control of the second calibration section 533. When the shutter 24a is moved by a drive mechanism (e.g., solenoid) into the space, the light emitted by the infrared light emitting diode 101 is reflected by the shutter 24a, and the photo transistor 103 receives the light reflected back by the shutter 24a. Alternatively, other reflective object may be used as a reference reflector in place of the shutter 24a coated with a material that exhibits diffuse reflection, e.g., the transport belt 12 with a color toner image transferred thereon.

As described above, the transport belt 12 has a specific area A1 with the width of W1. The first calibration section 532 differs from the second calibration section 533 in that calibration is performed without using the light reflected back by the area A1.

The first and second calibration sections 534 and 535 will be described in detail.

When the mechanism controller 53 performs the density correction process, the first and second sampling sections 534 and 535 read the density detection patterns 111 (FIG. 9) and 112 (FIG. 15), respectively, printed on the transport belt 12, and perform a sample obtaining control.

Using the photo transistor 102, the first sampling section 534 obtains sample data of a black segment of the density detection patterns 111 and 112. Using the photo transistor 103, the second sampling section 535 obtains sample data of colored segments (cyan (C), magenta (M), and yellow (Y)) of the density detection patterns 111 and 112.

Even if the photo transistor 102 reads the detection pattern printed in the area A1, the first sampling section 534 obtains samples in a manner in which the density correction process can be performed without sacrificing accuracy. The sampling by the first sampling section 534 will be described later.

The mechanism controller 53 controls a printing operation in which the density detection patterns 111 and 112 are printed on the transport belt 12. The first and second sampling sections 534 and 535 of the mechanism controller 53 serves as light intensity obtaining section that obtain the samples, i.e., voltages indicative of the levels of intensity of the light received from the density detection patterns 111 and 112. The mechanism controllers 53 serves as a selecting section that selects samples from those obtained, and uses them for a variety of correction processes. The mechanism controller 53 and gradation correction controller 80 serve as a density correcting section that perform the density correction based on the thus obtained samples, the density correction process for the image forming apparatus 1. The first and second sampling section 534 and 535 of the mechanism controller 53 serve as an output determining section that performs a calibration process, thereby determining the output voltages of the photo transistors 102 and 103.

{Operation}

The operation of the image forming apparatus 1 with the above described configuration will be described.

Figure 4:
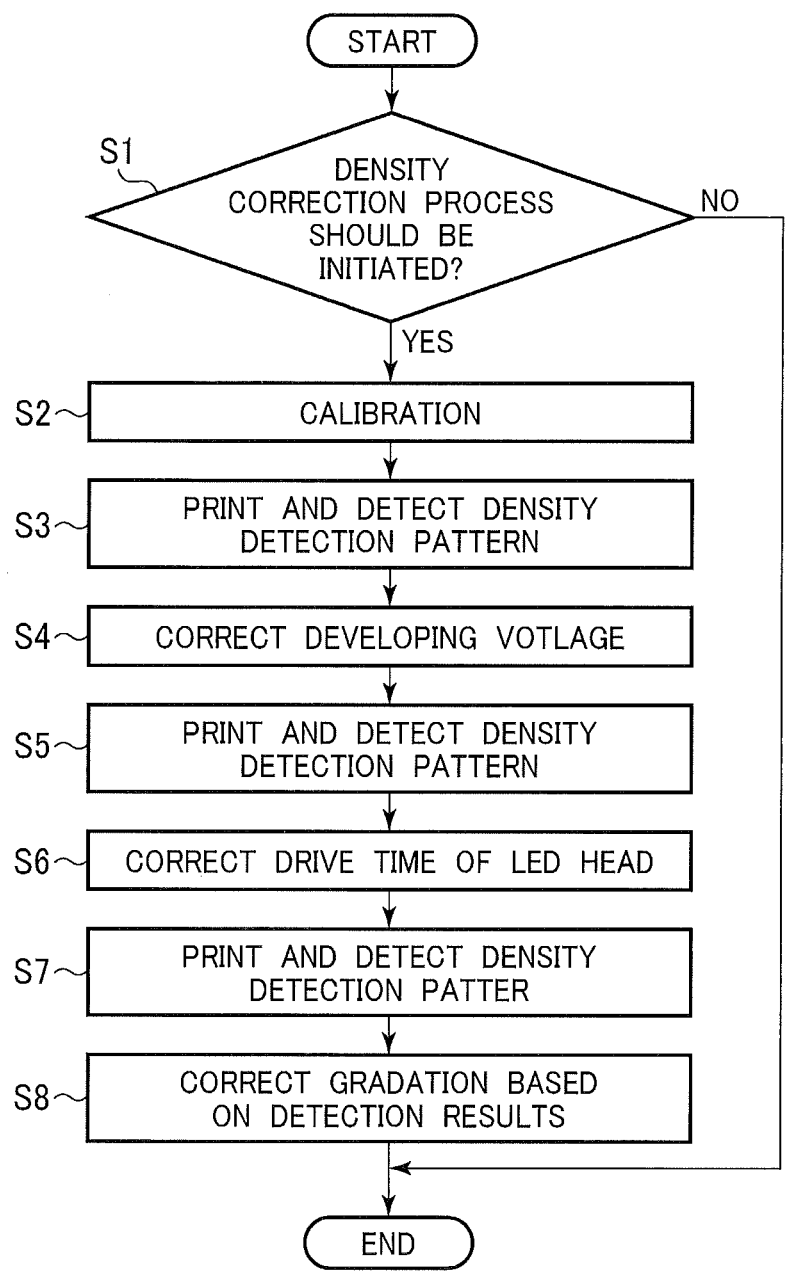
FIG. 4 is a flowchart, illustrating the operation of the image forming apparatus.

First, the adjustment process in the image forming apparatus 1 will be described. FIG. 4 is a flowchart, illustrating the operation of the image forming apparatus 1.

S1: A decision is made to determine whether the density correction determining section 531 of the mechanism controller 53 has determined that the density correction process should be initiated. If YES at S1, the procedure proceeds to S2. If NO, the density correction process is terminated.

S2: The density correction determining section 531 of the mechanism controller 53 performs the calibration process. The details of S2 will be described later.

S3: The first and second sampling sections 534 and 535 of the mechanism controller 53 reads the density detection pattern 111 shown in FIG. 9 from the memory 90, and prints the density detection pattern 111 on the transport belt 12. The mechanism controller 53 then obtains samples in the respective segments (K, Y, M, and C) of the density detection pattern 111 printed on the transport belt 12.

S4: The mechanism controller 53 determines correction values from the samples obtained at S3, and controls the high voltage controller 60 in accordance with the thus determined correction values, so that the high voltage controller 60 corrects the developing voltages to be supplied to the respective developing sections.

S5: Just as in S3, the mechanism controller 53 prints the density detection pattern 111 on the transport belt 12. The mechanism controller 53 then obtains the samples in the respective segments (K, Y, M, and C) of the density pattern 111 printed on the transport belt 12.

S6: Subsequently, the mechanism controller 53 determines correction values for drive times for the LED heads 301-304 in accordance with the samples obtained at S5. The mechanism controller 53 then controls the LED head interface 52 in accordance with the thus obtained correction values, thereby correcting the drive times of the LED heads 301-304.

S7: The mechanism controller 53 reads the density detection pattern 112 shown in FIG. 15 from the memory 90, and then prints the density detection pattern 112 on the transport belt 12. The mechanism controller 53 then obtains the samples in the respective segments of the density pattern 112 printed on the transport belt 12, hence the print density detection is performed.

S8: The gradation correction controller 80 corrects the gradation in accordance with the values of the samples detected with the mechanism controller 53. This completes the adjustment process of the image forming apparatus 1.

In the image forming apparatus 1, the above described processes are performed to adjust the physical characteristics of the print engines including the developing voltage and exposure time or drive time that determines the density the printed images of the LED heads. In addition, the gradation correction controller 80 of the command/image processing section 51 performs the gradation correction, thereby providing the reliable print density of printed images.

The respective steps in the flowchart shown in FIG. 4 will be described in detail.

{Process at S2}

A detailed description will be given of the process performed in S2 by the mechanism controller 53.

Figure 5:
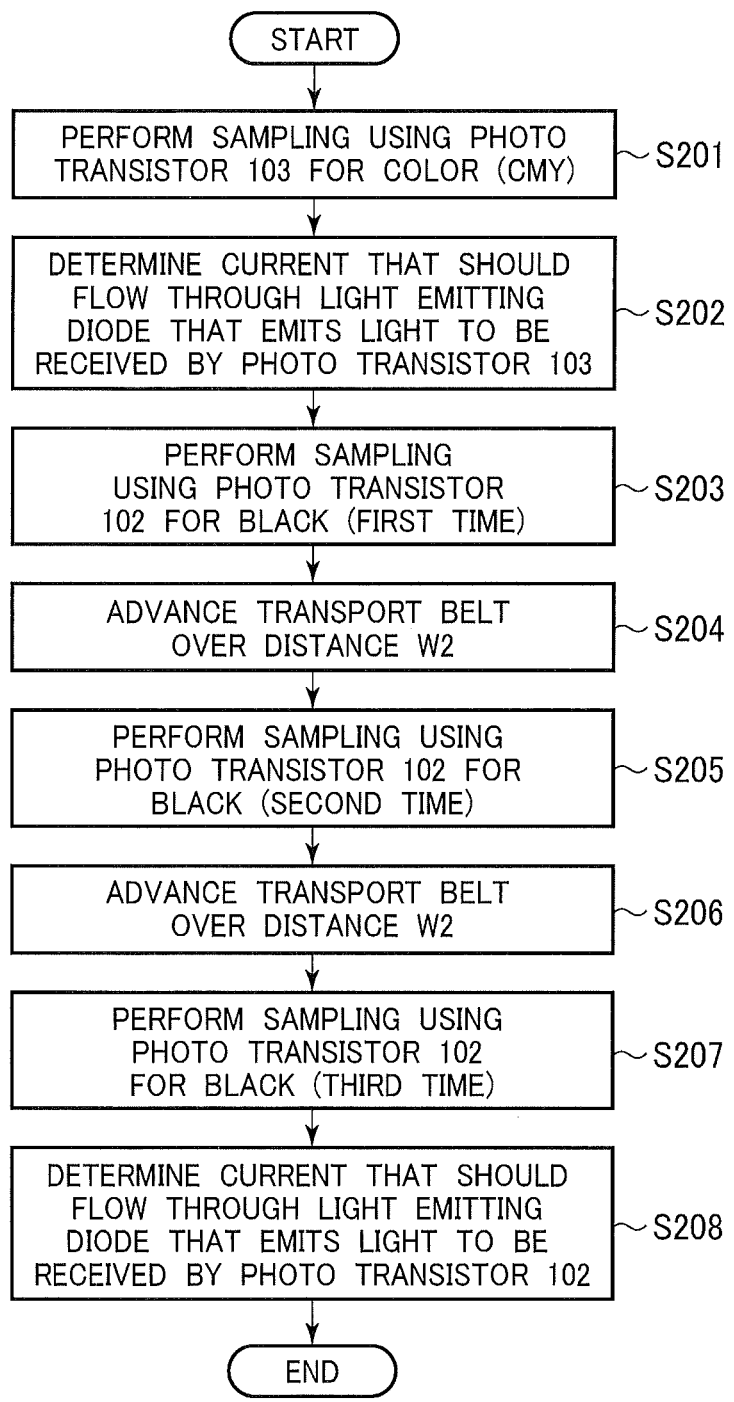
FIG. 5 is a flowchart, illustrating a calibration process performed by first and second sampling sections of a mechanism controller.

FIG. 5 is a flowchart illustrating the calibration process performed by the first and second sampling sections 534 and 535 of the mechanism controller 53.

S201: The second calibration section 533 of the mechanism controller 53 performs calibration process of the photo transistor 103 for colored density detection patterns (C, M, and Y). The second calibration section 533 causes the shutter 24a to slide into the space defined between the transport belt 12 and the photo transistor 103, and then drives the infrared light emitting diode 101 to emit light with a predetermined light output. The photo transistor 103 receives the light emitted from the infrared light emitting diode 101. The output voltage of the photo transistor 103 indicates the intensity of the light. Once the samples are obtained, the second calibration section 533 drives the shutter 24a to slide back to its home position.

S202: In accordance with the thus obtained samples, the second calibration section 533 determines the current that should flow through the infrared light emitting diode 101 that emits the light to be received by the photo transistor 103.

S203: The first calibration section 532 of the mechanism controller 53 performs the calibration process of the photo transistor 102 for the black segment.

The first calibration section 532 of the mechanism controller 53 causes the infrared light emitting diode 101 to emit light with a predetermined light output. The photo transistor 102 in turn receives the emitted light. The output voltage of the photo transistor 102 is then sampled to obtain the first sample.

S204: The first calibration section 532 causes the drive roller 13 to rotate so that the transport belt 12 advances a distance W2 equal to or longer than the width W1. As a result, the infrared light emitting diode 101 illuminates an area adjacent to the width W1. The following description assumes that the distance W2 is 74 mm.

S205: The first calibration section 532 then causes the infrared light emitting diode 101 to emit light with a predetermined light output, and obtains a second sample.

S206: The first calibration section 532 then causes the transport belt 12 to further advance another W2.

S207: The first calibration section 532 then obtains a third sample.

S208: In accordance with the third sample, the first calibration section 532 determines the current that should flow through the infrared light emitting diode 101. At this time, the first calibration section 532 selects one of the first, second, and third samples, assuming that they have been obtained from areas other than the area A1.

From the selected samples, the first calibration section 532 determines a current that should flow through the infrared light emitting diode 101. Specifically, using the median of the three samples, the first calibration section 532 determines the current that should flow through the infrared light emitting diode 101.

Figure 6:
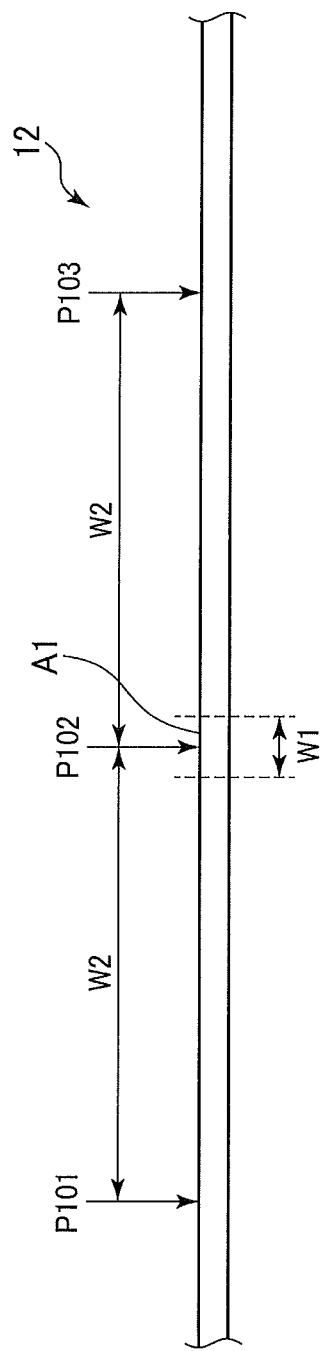
FIG. 6 is a side cross-sectional view of a transport belt, illustrating an area illuminated by an infrared light emitting diode of a first calibration section when obtaining samples.

FIG. 6 is a side cross-sectional view of the transport belt 12, illustrating an area illuminated by the infrared light emitting diode 101 of the first calibration section 532 when obtaining the samples. FIG. 6 is a side view of the transport belt 12, illustrating positions P101, P102, and P103 on the transport belt 12 at which the first calibration section 532 obtains the samples in this order. The distance between the points P101 and P102 and the distance between the points P102 and P103 are W2 (=74 mm). Assume the point P102 is in the area A1. The voltages of samples at the points P101, P102, and P103 are assumed to be voltage E101, E102, and E103, respectively. The distance W2 is longer than the width W1, and therefore there is a chance of the first calibration section 532 obtaining a single sample from the specific area A1.

Positions P101 and P103 are not in the area A1, and have substantially the same light reflection characteristic so that the voltages E101 and E102 are substantially the same. The position P102 is in the area A1 and has a light reflection characteristic different from those of the positions P101 and P103. Therefore, the difference between the voltages E101 and E102 and the difference between the voltages E102 and E103 are much larger than the difference between the voltages E101 and E103. Therefore, the voltage E101 or E103 may be determined as a median value of the voltage E101-E103. If the voltages E101, E102, and E103 are very close to one another, the calibration accuracy of the first calibration section 532 is not significantly affected. However, the voltages E101, E102, E103 are close to each other if a position in the area A1 has substantially the same reflection characteristic as other positions or none of the positions P101, P102, and P103 is in the area A1. When, for example, experiment shows that the sample obtained from the area A1 is lower in voltage than those obtained from areas other than the area A1 due to the light reflection characteristic of the surface of the transport belt 12, the first calibration section 532 may be configured to obtain only two samples and select one of the two samples, whichever is apparently not to be the sample from the area A1.

As described above, the first calibration section 532 and the second calibration section 533 of the mechanism controller 53 perform the calibration process.

{Process at S3}

A detailed description will be given of the process performed at S3 by the mechanism controller 53.

At S3, the first sampling section 534 reads the density detection pattern 111 (FIG. 9) from the memory 90 and the print engines 201-20 print the density detection pattern 111 on the transport belt 12. The second sampling section 535 reads the density detection pattern 112 (FIG. 15) from the memory 90 and the print engines 201-204 print the density detection pattern 112 (FIG. 15) on the transport belt 12. The first and second sampling sections 534 and 535 obtain sample data from the density detection patterns 111 and 112 printed on the transport belt 12, respectively.

The density detection pattern 111 includes three blocks aligned from downstream to upstream with respect to the direction of travel of the transport belt 12, each block including black (K), yellow (Y), magenta (M), and cyan (C) segments aligned from downstream to upstream. The segments in each of the three blocks have a corresponding duty ratio, i.e., the ratio of a dot-printed area to a unit area. The segments in the first block have a duty ratio of 30%. The segments in the second block have a duty ratio of 70%. The segments in the third block have a duty ratio of 100%. The three blocks are contiguous. The segments in each block are contiguous, and have a length of Lp mm.

The density detection pattern is not limited to the above-described pattern but may be altered, as required. The order in which colors are aligned may be modified and the duty ratios may be combined in a different way. The developing voltage and LED drive time are predetermined initial values, DB0 V and DK0 sec.

Figure 16:
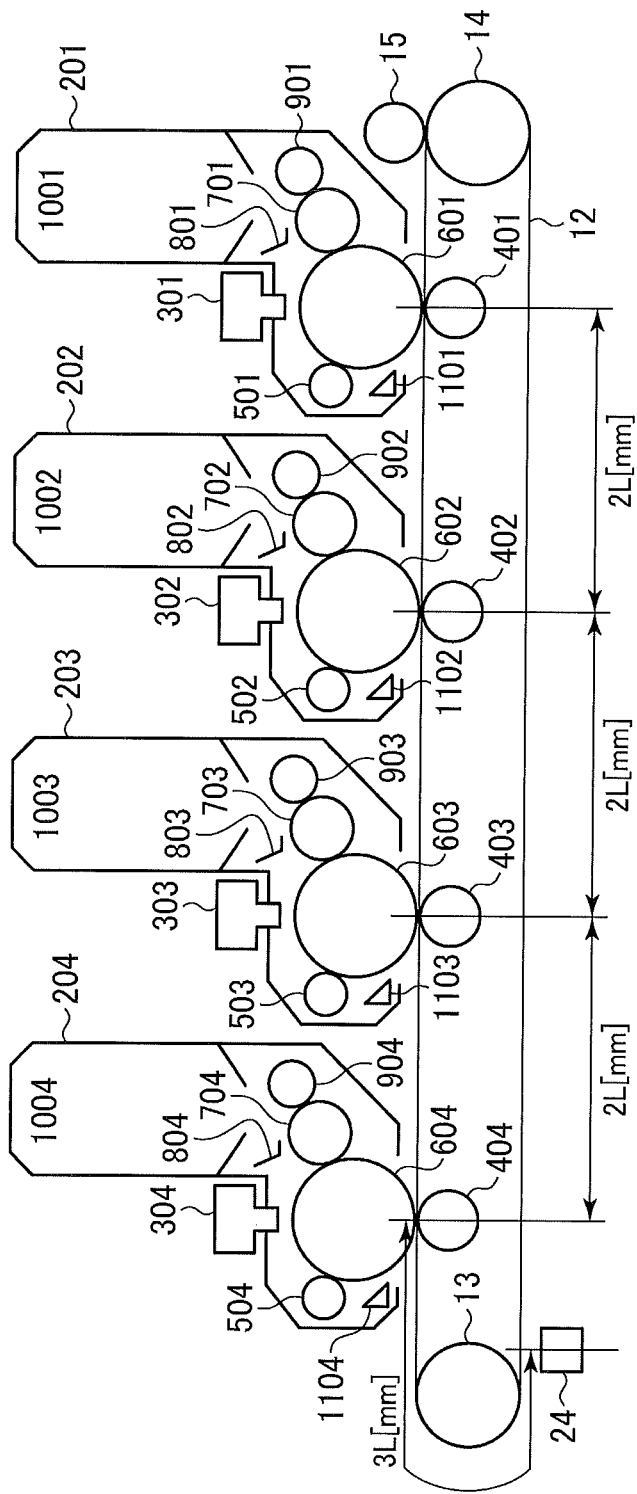
FIG. 16 is a schematic cross-sectional view of a pertinent portion of the image forming apparatus.

FIG. 16 is a schematic cross-sectional view of a pertinent portion of the image forming apparatus.

The distances between transfer points defined between the photoconductive drums 601-604 of the print engines 201-204 and the transfer rollers 401-404 are selected to be 2 L mm. The distance from the density sensor 24 to the transfer point defined between the photoconductive drum 604 of the print engine 204 is selected to be 3 L mm. Once the transport belt 12 runs over a distance of 9 L mm from a position where the black density detection pattern having a duty of 30% is printed, the black density detection pattern arrives at a position where the density sensor 24 measures the intensity of the light reflected from a density detection pattern printed on the transport belt 12. The transport belt 12 further runs over a distance of Lp/2 mm so that the middle portion of the black segment having a duty of 30% is in alignment with the density sensor 24.

The mechanism controller 53 supplies a predetermined amount of current to the infrared light emitting diode 101 of the density sensor 24, thereby causing the infrared light emitting diode 101 to emit infrared light that illuminates the density detection patter 111 printed on the transport belt 12. The infrared light is reflected back by the density detection pattern 111 and the transport belt 12, and is received in the photo transistor 102 and photo transistor 103. The photo transistors 102 and 103 are driven by a circuit (not shown) to output currents in proportion to the amount of received light energy. The currents are converted by a circuit (not shown) into voltages, which in turn are read by the mechanism controller 53. For chromatic colors (C, M, and Y), the mechanism controller 53 reads the output voltage of the photo transistor 103. For achromatic colors (K), the mechanism controller 53 reads the output voltage of the photo transistor 102. In this embodiment, the pattern detected first is the black density detection pattern having a duty of 30% and therefore the mechanism controller 53 reads the output voltage of the photo transistor 102. Subsequently, the transport belt 12 is run over a distance equal to the length Lp mm so that the middle portion of the yellow density detection pattern having a duty of 30% is aligned with the density sensor 24. The mechanism controller 53 reads the output voltage of the photo transistor 103. Likewise, the mechanism controller 53 reads the output voltages of the photo transistor 103 for all segments of the density detection pattern 111.

The specific processes performed in S3 will be described.

Figure 7:
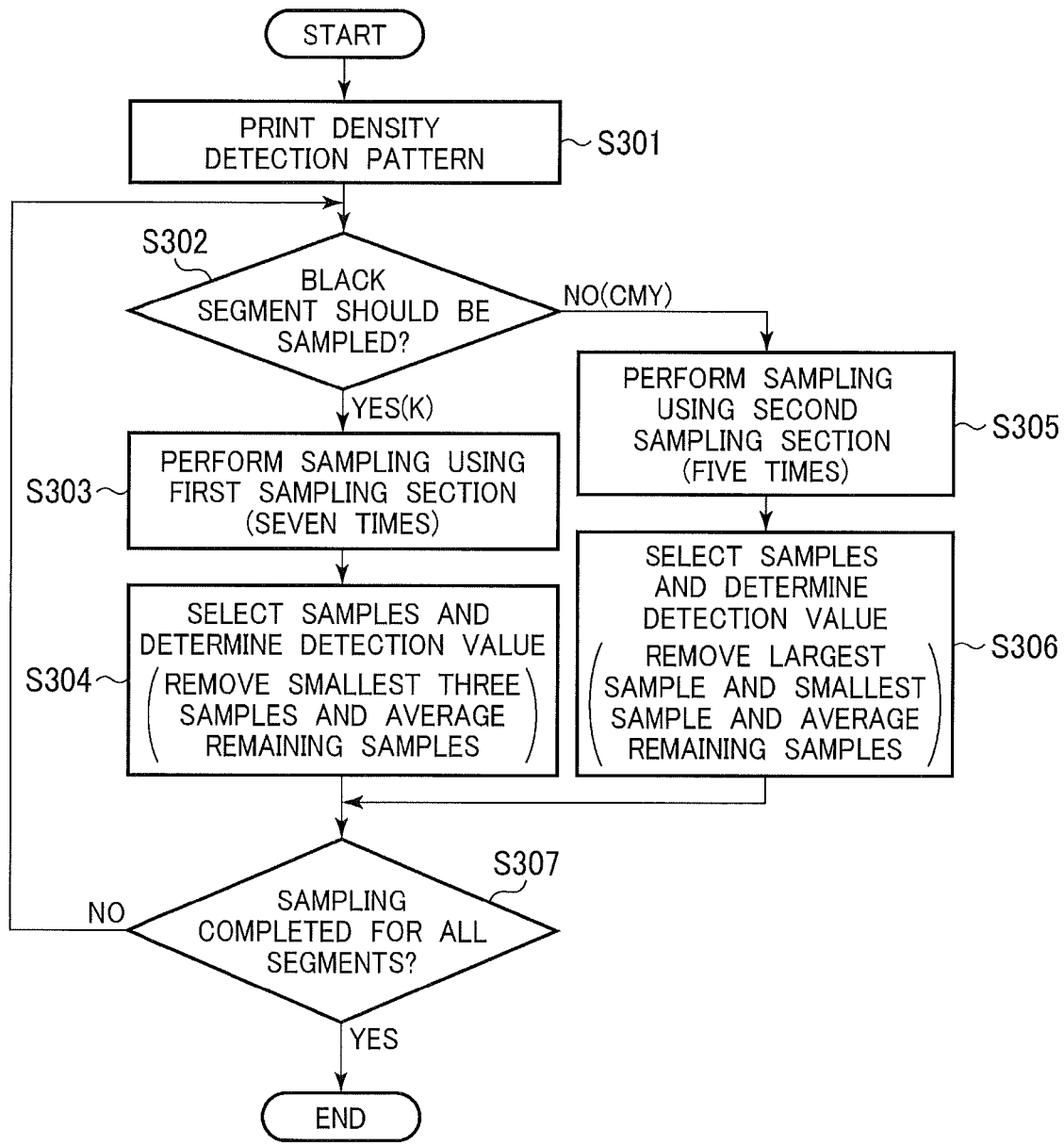
FIG. 7 is a flowchart, illustrating the detailed processes in S3 carried out by the first sampling section and a second sampling section of the mechanism controller.

FIG. 7 is a flowchart illustrating the detailed processes in S3 carried out by the first and second sampling sections 534 and 535 of the mechanism controller 53.

First, the mechanism controller 53 drives the print engines 201-204 to print the density detection pattern 111 on the transport belt 12 (S301).

The mechanism controller 53 then checks the color of the segment whose density is to be detected against the density detection pattern 111 stored in the memory 90 (S302). If the color of the segment is determined to be black, the program proceeds to S303: if no, the program proceeds to S305.

If the color of the segment is determined to be black at S302, the mechanism controller 53 controls the density sensor 24 and the belt motor 56 that drives the transport belt 12, thereby sampling the density detection pattern at 7 different locations in the black segment (S303).

The mechanism controller 53 discards a sample with a maximum value and samples with the smallest three values. The values of the remaining three samples are averaged and the average value is obtained as a sampling result of the black segment (S304).

If the color of the segment is one of cyan, magenta, and yellow (YES at S302), the mechanism controller 53 controls the density sensor 24 and the belt motor 56 that drives the transport belt 12, thereby sampling the segment at 5 different locations in the segment (S305)

The mechanism controller 53 discards a sample with a maximum value and a sample with a minimum value. The values of the remaining three samples are averaged and the averaged value is obtained as a sampling result of the color segment (S306).

Upon reception of the sampling results obtained at S305 or S306, the mechanism controller 53 determines whether all the segments of all the blocks have been sampled (S307).

A description will be made of the processes performed at S303 and S304.

As previously described, there is the specific area A1 having a width W1 on the transport belt 12. Therefore, when the first sampling section 534 has sampled a segment of the density detection in the specific area A1, that sample does not significantly affect the accuracy of the density correction process. The first sampling section 534 differs in this aspect from the second sampling section 535.

Figure 8:
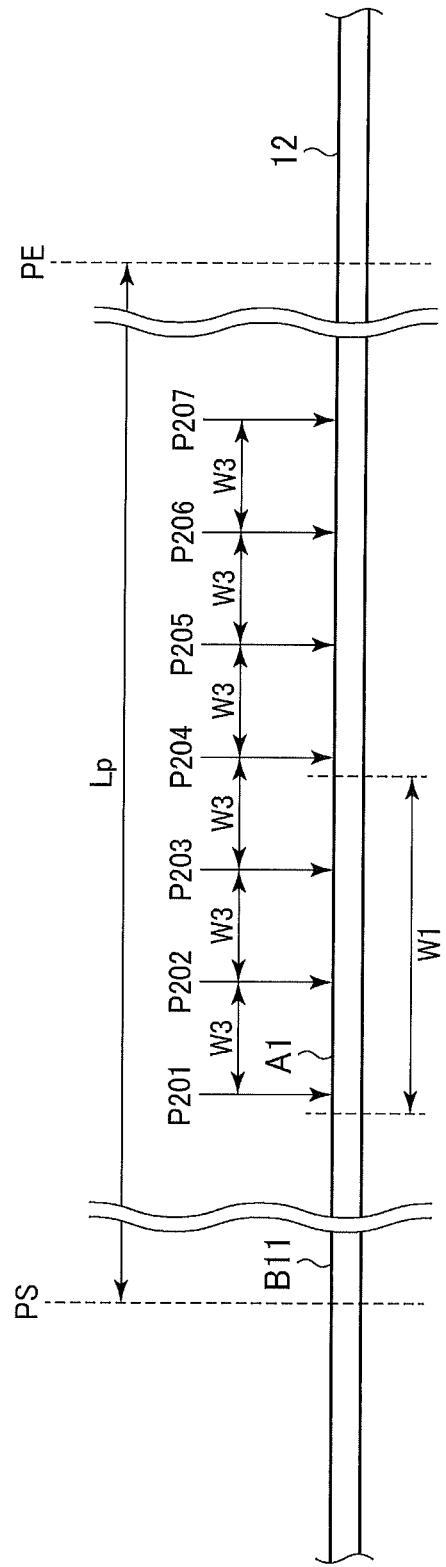
FIG. 8 is a side view of the transport belt, illustrating areas on the transport belt which are irradiated with the light emitted from the infrared light emitting diode.

FIG. 8 is a side view of the transport belt 12, and illustrates areas on the transport belt 12 which are irradiated with the light emitted from the infrared light emitting diode 101. The first sampling section 534 obtains samples from these areas. The first sampling section 534 samples the density detection pattern 111 at points P201 to P207 in this order. The points P201 to P207 are spaced apart by a distance W3, and are in the black segment B11 (FIG. 9). PS denotes the upstream end of the segment B11 and PE denotes the downstream end. Assume that positions P201 to P203 are in the specific area A1. For example, the width W1 is selected to be 5 mm, the distance W3 is selected to be 1.79 mm, and the length Lp is selected to be 25.4 mm. Assume that the voltages indicative of samples at positions P201 to P207 are E201 to E20, respectively.

The first sampling section 534 of the mechanism controller 53 drives the belt motor 56 to rotate continuously at a predetermined speed, and performs the sampling process at 7 different locations. In other words, the infrared light emitting diode 101 illuminates the density detection pattern 111 and the photo transistors 102 and 103 receives the light reflected back from the density detection pattern 111. The first sampling section 534 initiates the sampling process after the light emitted from the infrared light emitting diode 101 impinges the upstream end (PS in FIG. 8) of each segment. There are variations in the timing at which the sampling process is initiated, and so the distance between the upstream end PS and the position P201 may vary slightly from segment to segment.

In the embodiment, the reflection characteristic of the transport belt 12 is such that the sample result is, in general, lower in the specific area A1 on the transport belt 12 than in the other areas on the transport belt 12. Thus, the voltages E201 to E203 at the positions P 201 to P203 in the specific area A1 are lower than the voltages E204 to E207 at the positions P204 to P207 in the other areas on the transport belt 12.

The second sampling section 535 performs sampling at 5 locations or positions in each segment (S305). All other processes performed by the second sampling section 535 are the same as those performed by the first sampling section 534, and detailed description thereof is omitted.

As described above, the first sampling section 534 discards the largest sample and the three smallest samples, and the remaining three samples are employed as valid samples. It is assumed that the voltages E201 to E207 are related such that E201<E202<E203<E204<E205<E206<E207. The first sampling section 534 discards the voltage E207 which is the largest and the three smallest voltages E201 to E203. The remaining three voltages E204 to E206 are assumed to be those obtained from areas other than the specific area A1, and are obtained as valid samples.

As described above, when the first sampling section 534 performs sampling of the black segment using the photo transistor 102, it obtains not only N1 samples but also N2 samples in consideration of the width W1 and distance W3. N1 essential samples are basic samples and N2 samples are additional samples. The first sampling section 534 actually obtains N1+N3 samples, N3 being selected to be greater than N2. In other words, the first sampling section 534 actually obtains as many samples as N1+N3. For example, referring to FIG. 8, N1 is 3, N2 is 3, and N3 is 4, so that 7 (=N1+N3) samples are obtained.

By way of example, a description will be given of how the minimum number of additional samples, N2, is calculated. Referring to FIG. 8, W1 is 5 mm and W3 is 1.79 mm. This implies that up to three samples may be obtained from the specific area A1, in which case the N2 is 3. For example, N2 may obtained from the following equation.

$N2=(W1/W3)+1$, the fractions being truncated.

For the second sampling section 535, N1 is 3. However, even if the samples are obtained from the specific area A1, the samples obtained through the photo transistor 103 do not affect the level of accuracy in detecting the segments of the density detection pattern. Therefore, the second sampling section 535 does not need N2 samples. However, for the purpose of improving sampling accuracy, N3 is selected to be 2, the largest value and the smallest value are discarded, and the remaining three samples are employed as valid samples.

As described above, the second sampling section 535 does not need N3 samples or N3 could be any number if samples are actually obtained.

In the example shown in FIG. 8, due to the reflection characteristic of the transport belt 12, the sample values tend to be smaller for the samples obtained from the specific area A1 than for the samples obtained from the other areas. The first sampling section 534 assumes that the larger values of the obtained samples come from areas outside of the specific area A1, and that they are valid samples. Conversely, if the reflection characteristic of the transport belt 12 is such that the sample values are larger for the samples obtained from the specific area A1 than for the samples obtained from the other areas, the first sampling section 534 may be configured to accept the lower values of the obtained sample as valid samples. If the reflection characteristic of the transport belt 12 is unknown, the first sampling section 534 may be configured such that N2 is twice the value shown in FIG. 8 (i.e., N2=3× 2=6), N4 is 9 (i.e., 3+6=9), the largest three samples and the smallest three sample are used as valid samples (i.e., N1=3). In this case, N2 may be 2×Q where Q is obtained by the following equation.

$Q=W1/W3+1$, the fraction being truncated.

{Process at S4}

The operation of the mechanism controller 53 carried out in S4 will be described in detail.

At S4, the mechanism controller 53 compares the obtained voltages with the values in the sensor output expected value table 70, and calculates the differences between the obtained values and the expected value. Expected value is the output voltage of the sensor when the density read from the density detections pattern 11 is substantially equal to a target value. The memory 90 stores combinations of the duty ratios and the colors of segments of the density detection pattern.

The mechanism controller 3 calculates values or amounts by which the developing voltages for the respective colors should be incremented or decremented. This calculation is based on the amounts of adjustment listed in a voltage adjustment table 82 shown in FIG. 11. The values in the voltage adjustment table 82 are values by which the developing voltages for the respective colors should be incremented or decremented when the difference between the expected value and the value in the voltage adjustment table 82 is V1 V. In the embodiment, V1 is selected to be 0.1 V but is not limited to this value, and may be modified as required. In other words, the value in the voltage adjustment table 82 shows a change in developing voltage per unit change, V1, in the difference between the expected value in the sensor output expected value table 70 and the value in the output voltage of the sensor. For the black (K) segment having a density ratio of 30%, if the difference between the expected value in the sensor output expected value table 70 and the value in the output voltage of the sensor is 50 times larger than V1, then the developing voltage should be incremented or decremented by 50 times $\Delta KDB(A)_{30}$. The values in the voltage adjustment table 82 may be obtained by simulation or empirically determined based on the relation between the changes in the developing voltage and the corresponding outputs of the density sensor.

Figure 17:
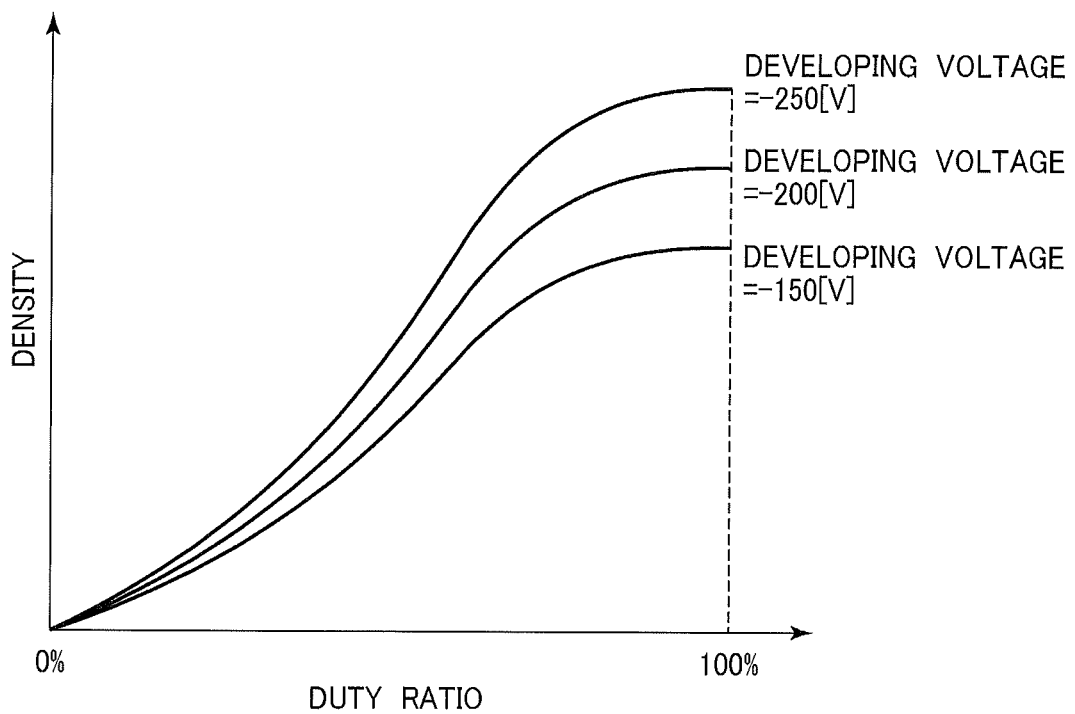
FIG. 17 illustrates the relationship between print duty ratios and print densities when a developing voltage is changed.

FIG. 17 illustrates the relationship between the duty ratios and the densities when the developing voltage is changed. Changing the developing voltage causes a change in the thickness of toner layer formed on the developing roller. Rate of the change in density is small for larger duty ratios. Using the characteristic provides stable solid printing.

By proportional interpolation, the mechanism controller 53 calculates an amount of change, which should be made to the developing voltage, from the actual voltage difference. The amount of developing voltage is calculated for three duty ratios for each color. However, only a single amount of developing voltage can be employed for each color irrespective of the duty ratio of the segment. Therefore, the average value of the three calculated values is employed as a developing voltage control amount DB(A). This calculation uses the voltage weighting coefficient table 71 shown in FIG. 13, which lists empirically determined optimum values.

Figures 18, 19:
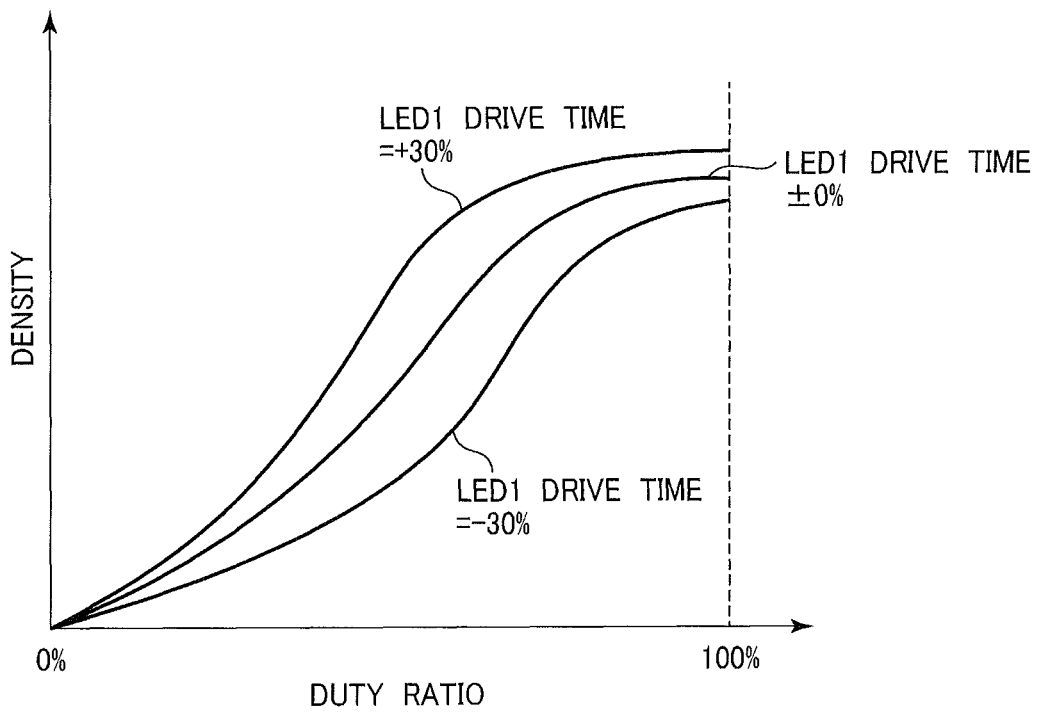
FIG. 18 illustrates the relationship between the print density and print duty ratio when an LED drive time is changed.
FIG. 19 shows the output voltages of a sensor when the sensor reads the cyan segments having duty ratios of 30%, 70%, and 100%, respectively, from the density detection pattern.

The process performed at S4 will be described in more detail by way of specific examples shown in FIGS. 19-21 and 24. The calculation will be described with respect to the amount of change in the developing voltage for cyan. The calculations for black, magenta, and yellow may be performed similarly, and their description is omitted for simplicity's sake. FIG. 19 shows the output voltages of the sensor when the sensor reads the cyan segments having duty ratios of 30%, 70%, and 100%, respectively, from the density detection pattern 111. FIG. 20 shows the specific values for cyan listed in the sensor output expected value table 70. Using Equations (1), (2), and (3), the mechanism controller 53 determines the differences between the values in the sensor output expected value table 70 and the outputs of the density sensor for the three duty ratios.

$$\Delta CD_{30} = CD_{30} - CD_{30}' \tag{1}$$

$$\Delta CD_{70} = CD_{70} - CD_{70}' \tag{2}$$

$$\Delta CD_{100} = CD_{100} - CD_{100}' \tag{3}$$

where $\Delta CD_{30}$, $\Delta CD_{70}$, and $\Delta CD_{100}$ are the differences for cyan between the values in the sensor output expected value table 70 and the outputs of the density sensor. The values of the $\Delta CD_{30}$, $\Delta CD_{70}$, and $\Delta CD_{100}$ are 0.1 V, 0.1 V, and 0.2 V, respectively.

Using the differences obtained from Equations (1), (2), and (3), the amounts of change in developing voltage are obtained from equations (4), (5), and (6).

$$CDB(A)_{30} = \Delta CD_{30}/(V1 \times \Delta CDB(A)_{30}) \tag{4}$$

$$CDB(A)_{70} = \Delta CD_{70}/(V1 \times \Delta CDB(A)_{70}) \tag{5}$$

$$CDB(A)_{100} = \Delta CD_{100}/(V1 \times \Delta CDB(A)_{100}) \tag{6}$$

where $CDB(A)_{30}$, $CDB(A)_{70}$, and $CDB(A)_{100}$ are the amounts of change in developing voltage of for duty ratios of 30%, 70%, and 100%, respectively. The values of the CDB $(A)_{30}$, $CDB(A)_{70}$, and $CDB(A)_{100}$ calculated using Equations (4), (5), and (6) are −50 V, −40 V, and −40 V, respectively. FIG. 21 shows the control amounts of developing voltage for cyan.

In the embodiment, the CDB(A) is an average value of three weighted amounts of change in the developing voltage, and is determined from Equation (7) using the values for cyan in the voltage weighting coefficient table 71.

$$CDB(A) = (CDB(A)_{30} \times CODB_{30} + CDB(A)_{70} \times CODB_{70} + CDB(A)_{100} \times CODB_{100})/(CODB_{30} + CODB_{70} + CODB_{100}) \tag{7}$$

where the CDB(A) is the amounts of change in developing voltage From equation (7), CDB(A) is nearly equal to −42 V.

The mechanism controller 53 sends a command to increment or decrement the developing voltage to the high voltage controller 60 in accordance with the amounts of change in developing voltage, DB(A), obtained at S4.

The DB voltage generator 62 adds the amounts of change in developing voltage, DB(A), to the initial values DB0, thereby obtaining corrected developing voltages, DB1, and then supplies the corrected developing voltages to the respective print engines 201-204.

$$DB1 = DB0 + DB(A) \tag{8}$$

{Process at S5}

The process at S5 performed by the mechanism controller 53 will now be described in detail.

At S5, just as in S3, upon reception of a command to initiate the density detection process, the mechanism controller 53 starts to print the density detection patter 111 on the transport belt 12, the density sensor 24 reads the densities of the segments of the density detection pattern 111, and outputs corresponding voltages indicative of the densities.

{Process at S6}

The process at S6 performed by the mechanism controller 53 will now be described in detail.

At S6, the mechanism controller 53 compares the output voltages of the density sensor 24 with the values listed in the sensor output expected value table 70, thereby calculating the differences between the output voltages and the values in the sensor output expected value table 70.

The mechanism controller 53 then calculates how much the initial exposure time, DK0, should be incremented or decremented for the LED heads 301-304 so that the density of the printed image is equal to the target density. The calculation is based on the values in the LED drive time adjustment table 83 stored in the memory 90. FIG. 12 illustrates the LED drive time adjustment table 83. The values in the LED drive time adjustment table 83 indicate how much the LED drive times, DK0, of the LED heads 301-304 should be incremented or decremented when the differences between the output voltages of the density sensor and the values in the sensor output expected value table 70 are V2 V. In the embodiment, V2 is selected to be 0.05 V, but is not limited to this value, and may be modified as required. The values in the LED drive time adjustment table 83 may be obtained by simulation or empirically determined based on the relation between the changes in the LED drive time and the corresponding outputs of the density sensor 24.

FIG. 18 illustrates the relationship between the print density and print duty ratio when the LED drive time is changed. When the LED drive time is changed, the density varies more greatly in the middle density ratio range than in the low and high duty ratio ranges. Using this characteristic, the density in the intermediate density range can be stabilized.

By proportional interpolation, the mechanism controller 53 calculates an amount of change in LED drive time from the actual voltage difference. The amount of LED drive time is calculated for three duty ratios for each color. Only a single amount of change in LED drive time can be employed for each color irrespective of the duty ratio of the segment. Therefore, the average value of the three calculated values is employed as an amount of change in LED drive time DK (A). This calculation uses values in the time weighting coefficient table 72 shown in FIG. 14, which lists empirically determined optimum values.

The process performed at S6 will be described in more detail by way of specific examples shown in FIGS. 22, 23, and 25. Subsequently to S4, the calculation will be described with respect to the amount of change in LED drive time for cyan. The calculations for black, magenta, and yellow may be performed similarly, and their description is omitted for simplicity's sake. FIG. 22 shows the output voltages of the sensor when the sensor reads the cyan segments having duty ratios of 30%, 70%, and 100%, respectively, from the density detection pattern 111. FIG. 20 shows the specific values for cyan listed in the sensor output expected value table 70. The mechanism controller 53 determines the differences between the values in the sensor output expected value table 70 and the output voltages of the density sensor from equations (9), (10), and (11) for the three duty ratios: 30%, 70%, and 100%.

$$\Delta CD_{30}' = CD_{30} - CD_{30}'' \quad (9)$$

$$\Delta CD_{70}' = CD_{70} - CD_{70}'' \quad (10)$$

$$\Delta CD_{100}' = CD_{100} - CD_{100}'' \quad (11)$$

where $\Delta CD_{30}'$, $\Delta CD_{70}'$ and $\Delta CD_{100}'$ are the differences between the values in the sensor output expected value table 70 and the output voltages of the density sensor for cyan. The values of the $\Delta CD_{30}'$, $\Delta CD_{70}'$, and $\Delta CD_{100}'$ are 0.02 V, 0.01 V, and −0.01 V, respectively.

Using the differences obtained from Equations (9), (10), and (11), the amounts of change in LED drive time for cyan are obtained from Equations (12), (13), and (14). FIG. 23 is a table illustrating the specific amounts of change in LED drive time for cyan.

$$CDK(A)_{30} = \Delta CD_{30}'/(V1 \times \Delta CDK(A)_{30}) \quad (12)$$

$$CDK(A)_{70} = \Delta CD_{70}'/(V1 \times \Delta CDK(A)_{70}) \quad (13)$$

$$CDK(A)_{100} = \Delta CD_{100}'/(V1 \times \Delta CDK(A)_{100}) \quad (14)$$

where $CDK(A)_{30}$, $CDK(A)_{70}$, and $CDK(A)_{100}$ are the amounts of change in LED drive time for duty ratios of 30%, 70%, and 100%, respectively. The values of the $CDK(A)_{30}$, $CDK(A)_{70}$, and $CDK(A)_{100}$ are 13%, −2%, and −8%, respectively. The average value of the three weighted amounts of LED drive time is employed as an amount by which the LED drive time CDK(A) should be changed. Using values in a time weighting coefficient table 72 shown in FIG. 25, the mechanism controller 5 calculates the amount of change in LED drive time, CDK(A), as follows:

$$CDK(A) = (CDK(A)_{30} \times CODK_{30} + CDK(A)_{70} \times CODK_{70} + CDK(A)_{100} \times CODK_{100})/(CODK_{30} + CODK_{70} + CODK_{100}) \quad (15)$$

where the CDK(A) is the amount of change in LED drive time. From equation (15), CDK(A)≈2%.

As described above, in accordance with the thus obtained amount by which the LED drive time, DK(A), should be changed for the respective colors, the mechanism controller 53 sends a command to increment or decrement the LED drive time for the LED heads 301-304, to the LED head interface 52. During the printing operation, the LED head interface 52 drives the respective LED heads 301-304 to illuminate the photoconductive drums for the LED drive time, which is obtained by adding the amount by which the LED drive time, DK(A), should be changed, to the initial LED drive time, DK0, from the following equation.

$$DK1 = DK0 + DK0 \times DK(A) \text{ second} \quad (16)$$

where DK1 is a corrected LED drive time.
{Process at S7}

The operation performed by the first sampling section 534 and second sampling section 535 of the mechanism controller 53 will described in detail.

At S7, upon reception of a command to initiate the density detection process, the mechanism controller 53 starts to read the density detection pattern 112 (FIG. 15) from the memory 90 and to print the density detection patter 112 on the transport belt 12. The density detection pattern 112 includes five blocks. A first block includes black (K), yellow (Y), magenta (M), and cyan (C) having a duty ratio of 20%. A second block includes black (K), yellow (Y), magenta (M), and cyan (C) having a duty ratio of 40%. A third block includes black (K), yellow (Y), magenta (M), and cyan (C) having a duty ratio of 60%. A fourth block includes black (K), yellow (Y), magenta (M), and cyan (C) having a duty ratio of 80%. A fifth block includes black (K), yellow (Y), magenta (M), and cyan (C) having a duty ratio of 100%. Each block includes black (K), yellow (Y), magenta (M), and cyan (C) segments aligned from downstream to upstream in this order. In this embodiment, the density values between the duty ratios 20, 40, 60, 80, and 100% are interpolated from the print density data describing print densities that the density sensor 24 read from the density detection pattern 112 on the transport belt 12. Thus, the more samples, more accurate interpolation. For this reason, the duty ratios 20, 40, 60, 80, and 100% were employed. The density detection pattern is not limited to that used in the embodiment but may be modified as required. For example, the segments of the respective colors may be aligned in a different order and/or different duty ratios may be combined.
{Process at S8}

By way of example with reference to FIGS. 26-29, a detailed description will be given of the process in S8 which is performed by the gradation correction controller 80. FIG. 26 illustrates the relationship among the duty ratio, gradation level, and density.

The gradation correction controller 80, which is a part of the command/image processing section 51, receives the print density data from the mechanism controller 53. The density detection pattern 112 includes five blocks. A first block includes black (K), yellow (Y), magenta (M), and cyan (C) having a duty ratio of 20%. A second block includes black (K), yellow (Y), magenta (M), and cyan (C) having a duty ratio of 40%. A third block includes black (K), yellow (Y), magenta (M), and cyan (C) having a duty ratio of 60%. A fourth block includes black (K), yellow (Y), magenta (M), and cyan (C) having a duty ratio of 80%. A fifth block includes black (K), yellow (Y), magenta (M), and cyan (C) having a duty ratio of 100%. Each block includes black (K), yellow (Y), magenta (M), and cyan (C) segments aligned from downstream to upstream in this order. The duty ratios of 20, 40, 60, 80, and 100% may be quantified into 256 gradation levels: gradation levels 51, 102, 153, 204, and 255, respectively. The gradation correction controller 80 quantifies the print density values into 256 gradation levels by interpolation.

The memory 81 stores the target gradation table 87 which lists density values and corresponding gradation levels and is illustrated in FIG. 27. The density values in the target gradation table 87 may be obtained by simulation or empirically determined to reproduce substantially ideal continuous gradation.

Figure 28:
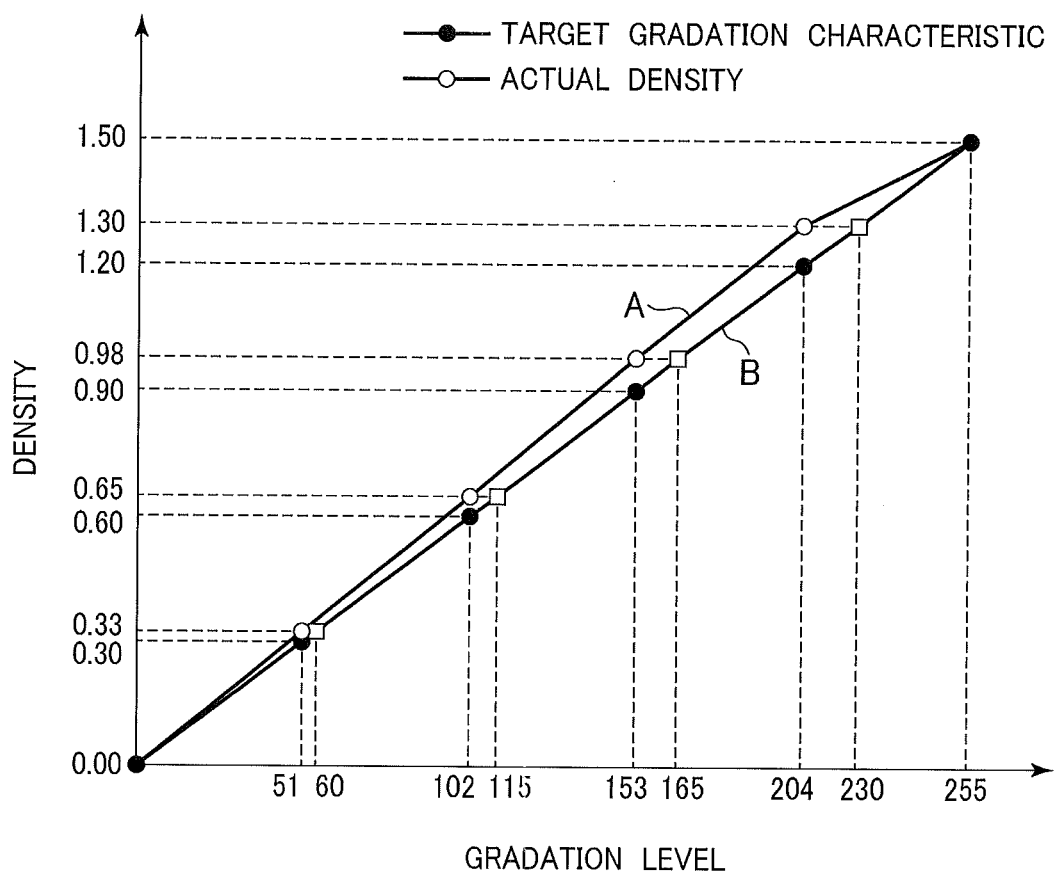
FIG. 28 illustrates the relationship between the print density and the gradation level.

The gradation correction controller 80 compares an actual print density characteristic with the target characteristic. If they coincide, ideal continuous gradation may be possible. In reality, the actual print density characteristic may deviate from the target characteristic. FIG. 28 illustrates the relationship between the print density and the gradation level, Curve A and Curve B showing the actual print density and the target gradation characteristic, respectively. FIG. 29 illustrates the gradation correction table 84. For example, for a gradation level of 51, the actual characteristic shows a print density of 0.33 while the target characteristic shows a print density of 0.3. The density of 0.33 of the actual characteristic corresponds to a gradation level of 60. Thus, when an input gradation level of the gradation correction table 84 is "51," the gradation correction controller 80 sets an output gradation level of the gradation table 84 to "60." Likewise, for a gradation level of 102, the actual characteristic shows a print density of 0.65 while the target characteristic shows a print density of 0.60. Thus, when an input gradation level of the gradation correction table 84 is "102," the gradation correction controller 80 sets an output gradation level to "115." In this manner, other input and output gradation levels are obtained and stored in the gradation correction table 84. When the image data is to be set to a certain output gradation level, the gradation correction table 84 enables determining of the required input gradation level. The thus determined input gradation level is used to process the image to obtain a print result with the desired output gradation level.

In the density correction process, the physical characteristics (e.g., developing voltage and LED exposure time) of the print engines of the image forming apparatus 1 are adjusted through the aforementioned processes, and gradation correction is performed by the gradation correction controller 80 of the command/image processing section 51, so that the stable print density of print results may be obtained.

The embodiment provides the following advantages.

The first sampling section 534 obtains samples used in correcting the density of black segments. The first sampling section 534 produces N4 samples by adding the N3 samples to N1 samples, and then selects samples valid for density correction. This operation of the image forming apparatus 1 prevents accuracy of density correction from being deteriorated.

The first calibration section 532 performs the calibration of the black segments. Specifically, the first calibration section 532 obtains a plurality of samples at different locations in the width W1 of the specific area A1 defined at intervals equal to the distance W2 longer than the W1, thereby selecting samples valid for calibration. This operation of the image forming apparatus 1 prevents accuracy of the calibration process from becoming poor even if the specific area A1 has a reflection characteristic different from the other areas on the transport belt 12.

The present invention is not limited to the embodiment and may be modified as follows:

While the image forming apparatus according to the embodiment has been described in terms of a printer, the present invention may be applied to a variety of image forming apparatus, e.g., multi-function peripherals having a facsimile function and a scanner function.

Although the image forming apparatus according to the embodiment uses achromatic toner (black K) and chromatic colors (Y, M, C), the invention may be applied to an image forming apparatus that uses only black toner, in which case the photo transistors 102 and 103, second calibration section 533, second sampling section 535, chromatic color segments of the density detection pattern, and processes involving the chromatic color segments are omitted.

What is claimed is:

1. An image forming apparatus, comprising:
a density detection image forming section configured to drive at least one image forming unit to form a density detection image on a surface of a belt;
a drive section configured to drive the belt to run;
a light source that irradiates the density detection image with light;
a light receiving section that receives light reflected by the density detection image and outputs an output signal indicative of an intensity of the received light;
a light intensity obtaining section configured to cause the drive section to drive the belt to run and the light source to emit light so that the light source irradiates the density detection image a first number of times at intervals of a first distance in a direction in which the belt runs, and the light receiving section receives the light reflected from the density detection image, the first number of times being determined by at least the first distance and a second distance in which the first distance lies;
a selecting section configured to select a second number of levels of light intensity from among a plurality of levels of light intensity obtained by the light intensity obtaining section; and
a density correcting section configured to perform print density correction for the at least one image forming unit by using the second number of levels of light intensity selected by the selecting section.

2. The image forming apparatus according to claim 1, wherein the at least one image forming unit includes a first image forming unit that forms a first image using developer material of a first color and a second image forming unit that forms a second image using developer material of a second color;
wherein the density detection image forming section drives the first image forming unit to form a first image on the belt and the second image forming unit to form a second image on the belt;
wherein the light receiving section includes a first light receiving section that receives light reflected by the first image and a second light receiving section that receives light reflected by the second image; and
wherein the light intensity obtaining section obtains the first number of levels of light intensity from the first image and a third number of levels of light intensity from the second image.

3. The image forming apparatus according to claim 2, wherein the light intensity obtaining section holds the first number obtained by adding a predetermined number to a third value derived from a ratio of the second distance to the first distance.

4. The image forming apparatus according to claim 3, wherein the second number of levels of light intensity is selected except for the light reflected from a first area with a perimeter such that the second distance is a part of the perimeter.

5. The image forming apparatus according to claim 4, wherein the second number of levels of light intensity is selected from a group of the levels of light intensity assumed to be obtained from areas on the belt other than the first area, the assumption being made based on a reflection characteristic.

6. The image forming apparatus according to claim 2, further comprising a calibration section configured to determine a light output of the light source that should be outputted;
wherein the light intensity obtaining section causes the drive section to drive the belt to run and the light source to emit the light so that the light source irradiates surface areas on the belt which are located at intervals of a third distance in the direction longer than the second distance, and the light receiving section receives the light reflected by the surface areas and outputs output signals indicative of levels of light intensity of the light received from the surface areas;
wherein the selecting section selects the second number of levels of light intensity from among the levels of light intensity.

7. The image forming apparatus according to claim 6, wherein the output determining section selects the second number of light intensity from a group of the levels of light intensity that are assumed to be obtained from areas on the belt other than the first area.

8. The image forming apparatus according to claim 7, wherein the output determining section selects a median of the second number of levels of light intensity.

9. A method of controlling an image forming apparatus, comprising:
   forming a density detection image on a surface of a transport belt;
   irradiating the density detection image on the transport belt with light;
   receiving light reflected by the density detection image;
   obtaining a plurality of levels of light intensity of the light reflected by different areas on the density detection image;
   selecting a number of levels of light intensity from the plurality of levels of light intensity;
   performing print density correction for the image forming apparatus based on the number of levels of light intensity.

10. The method according to claim 9, wherein the number of levels of light intensity is determined based at least on a first distance and a second distance in which the first distance lies.

11. The method according to claim 9, wherein the obtaining includes obtaining a plurality of signals, each signal representing a corresponding one of the plurality of levels of light intensity.

12. The method according to claim 9, wherein the irradiating includes:
   irradiating the density detection image a number of times at intervals of a first distance in a direction in which the belt runs, the first distance being longer than a second distance over a surface area of the belt that extends in the direction and has a different reflection characteristic from remaining surface areas of the belt.

13. An image forming apparatus capable of forming a density detection pattern, the density detection pattern including a first image of a first color and a second image of a second color, the apparatus comprising:
   a transport belt that transports a sheet thereon;
   a pattern forming section configured to form the density detection pattern on the transport belt;
   a light source that irradiates the density detection pattern on the transport belt with light;
   a first light receiving sensor that receives the light reflected from the density detection pattern;
   a second light receiving sensor that receives the light reflected from the density detection pattern;
   a first correcting section configured to drive the first light receiving sensor to detect the reflected light from the first image a first number of times and then perform density correction for the first color; and
   a second correcting section configured to drive the second light receiving sensor to detect the reflected light from the second image a second number of times and then perform density correction for the second color.

14. The image forming apparatus according to claim 13, wherein the first color is black and the second color is one of yellow, cyan, and magenta.

15. The image forming apparatus according to claim 14, wherein the first light receiving sensor receives light reflected from the first image due to specular reflection, and the second light receiving sensor receives light reflected from the second image due to diffuse reflection.

16. The image forming apparatus according to claim 14, wherein the first number of times is larger than the second number of times.

* * * * *